United States Patent
Oh et al.

(10) Patent No.: US 12,482,881 B2
(45) Date of Patent: Nov. 25, 2025

(54) POUCH-TYPE SECONDARY BATTERY AND BATTERY MODULE HAVING THE SAME

(71) Applicant: LG Energy Solution, Ltd., Seoul (KR)

(72) Inventors: Se Young Oh, Daejeon (KR); Jeong Min Ha, Daejeon (KR); Sin Woong Kim, Daejeon (KR); Geun Hee Kim, Daejeon (KR); Hyun Beom Kim, Daejeon (KR); Hyung Ho Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/570,799

(22) Filed: Jan. 7, 2022

(65) Prior Publication Data
US 2022/0320635 A1   Oct. 6, 2022

(30) Foreign Application Priority Data

Mar. 30, 2021   (KR) ........................ 10-2021-0041419

(51) Int. Cl.
*H01M 50/105* (2021.01)
*C22C 21/00* (2006.01)
(Continued)

(52) U.S. Cl.
CPC ........... *H01M 50/105* (2021.01); *C22C 21/00* (2013.01); *H01M 10/613* (2015.04);
(Continued)

(58) Field of Classification Search
CPC ............. H01M 50/105; H01M 10/613; H01M 10/647; H01M 50/119; H01M 50/121;
(Continued)

(56) References Cited

U.S. PATENT DOCUMENTS

2007/0224499 A1*   9/2007   Kodama ............. H01M 50/126
                                                              429/163
2009/0311592 A1   12/2009   You et al.
(Continued)

FOREIGN PATENT DOCUMENTS

CN           101043072 A       9/2007
CN           101529613 A       9/2009
(Continued)

OTHER PUBLICATIONS

Partial European Search Report for Application No. 21213671.7 dated Dec. 12, 2022. 14 pgs.
(Continued)

*Primary Examiner* — Matthew T Martin
*Assistant Examiner* — Grace Ann Kenlaw
(74) *Attorney, Agent, or Firm* — Lerner David LLP

(57) ABSTRACT

A pouch-type secondary battery includes an electrode assembly, in which a plurality of positive electrodes and a plurality of negative electrodes are alternately stacked with separators therebetween, and a pouch which is formed by sealing a pair of cases integrally connected to each other by a folding portion and includes an accommodation portion that accommodates the electrode assembly. A plurality of outer walls forming a perimeter of the accommodation portion may include a folding portion-side outer wall, which includes the folding portion, and a sealing portion-side outer wall which is connected to a sealing portion in which the pair of cases are fused to each other. An average distance between ends of the plurality of negative electrodes and the folding portion-side outer wall may be about 0.6 mm or less.

17 Claims, 20 Drawing Sheets

(51) Int. Cl.
*H01M 10/613* (2014.01)
*H01M 10/625* (2014.01)
*H01M 10/647* (2014.01)
*H01M 50/119* (2021.01)
*H01M 50/121* (2021.01)
*H01M 50/129* (2021.01)
*H01M 50/184* (2021.01)
*H01M 50/211* (2021.01)
*H01M 50/249* (2021.01)

(52) U.S. Cl.
CPC ....... *H01M 10/625* (2015.04); *H01M 10/647* (2015.04); *H01M 50/119* (2021.01); *H01M 50/121* (2021.01); *H01M 50/129* (2021.01); *H01M 50/184* (2021.01); *H01M 50/211* (2021.01); *H01M 50/249* (2021.01); *H01M 2220/20* (2013.01)

(58) Field of Classification Search
CPC ............ H01M 50/129; H01M 50/184; H01M 50/211; H01M 50/548; H01M 10/0525; H01M 10/0431; H01M 50/186; H01M 50/188
See application file for complete search history.

(56) References Cited

U.S. PATENT DOCUMENTS

| | | | |
|---|---|---|---|
| 2009/0317708 A1 | 12/2009 | Brandl et al. | |
| 2010/0047685 A1 | 2/2010 | Lee et al. | |
| 2013/0084484 A1 | 4/2013 | Shinyashiki et al. | |
| 2013/0130098 A1 | 5/2013 | Lee et al. | |
| 2015/0287962 A1 | 10/2015 | Abe | |
| 2016/0141587 A1* | 5/2016 | Suh | H01M 50/126 429/186 |
| 2016/0190578 A1 | 6/2016 | Momo et al. | |
| 2018/0102514 A1* | 4/2018 | Dai | H01G 11/16 |
| 2019/0027714 A1 | 1/2019 | Jung et al. | |
| 2019/0237832 A1* | 8/2019 | Ju | H01M 50/119 |
| 2019/0305260 A1 | 10/2019 | Kim et al. | |
| 2019/0393452 A1 | 12/2019 | Kim et al. | |
| 2020/0365836 A1 | 11/2020 | Jung et al. | |
| 2021/0066676 A1 | 3/2021 | Jung et al. | |
| 2022/0102786 A1 | 3/2022 | Kim et al. | |
| 2022/0158272 A1 | 5/2022 | Ju et al. | |
| 2022/0158276 A1 | 5/2022 | Kim et al. | |
| 2023/0187743 A1 | 6/2023 | Cheng et al. | |

FOREIGN PATENT DOCUMENTS

| | | | |
|---|---|---|---|
| CN | 103035871 A | 4/2013 | |
| CN | 105034489 A | 11/2015 | |
| CN | 106252532 A | 12/2016 | |
| CN | 109643768 A | 4/2019 | |
| CN | 111653694 A | 9/2020 | |
| JP | 2001126678 A | 5/2001 | |
| JP | 2004-216825 A | 8/2004 | |
| JP | 2013077447 A | 4/2013 | |
| JP | 2016127016 A | 7/2016 | |
| JP | 2017103219 A | 6/2017 | |
| JP | 2017117696 A | 6/2017 | |
| JP | 2019-212534 A | 12/2019 | |
| JP | 2020004712 A | 1/2020 | |
| KR | 20030014351 A | 2/2003 | |
| KR | 2007-0056426 A | 6/2007 | |
| KR | 100731437 B1 | 6/2007 | |
| KR | 20070102768 A | 10/2007 | |
| KR | 20080017264 A | 2/2008 | |
| KR | 20170069981 A | 6/2017 | |
| KR | 20180029856 A | 3/2018 | |
| KR | 2018-0071983 A | 6/2018 | |
| KR | 20190010434 A | 1/2019 | |
| KR | 20190032609 A | 3/2019 | |
| WO | WO-2018097054 A1 * | 5/2018 | ............ B21D 19/00 |
| WO | 2019017637 A1 | 1/2019 | |
| WO | 2019-124282 A1 | 6/2019 | |
| WO | WO-2020067131 A1 * | 4/2020 | |

OTHER PUBLICATIONS

Extended European Search Report for Applicaiton No. 21213671.7 dated Apr. 25, 2023. 16 pgs.

* cited by examiner

[FIG. 1]
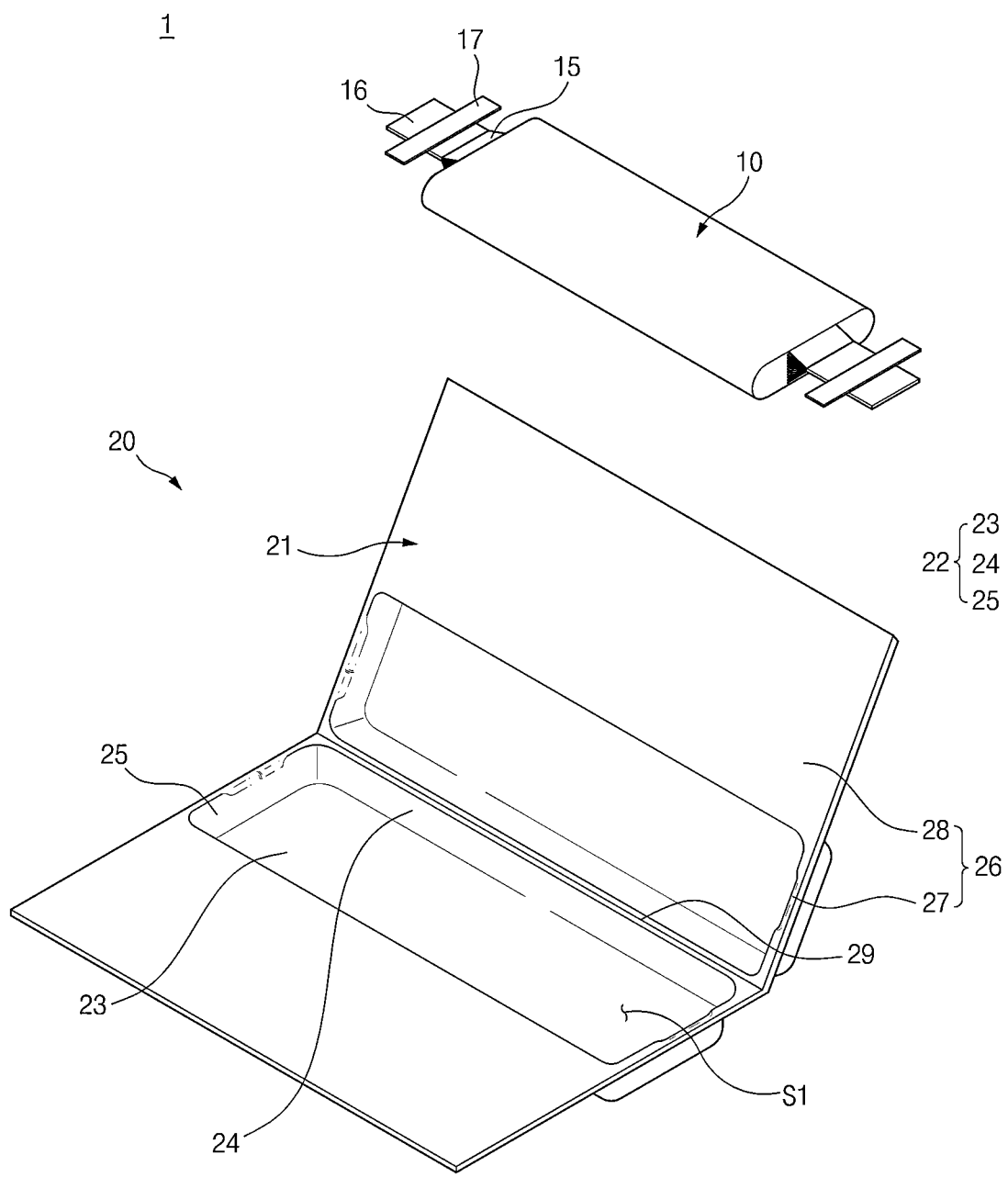

[FIG. 2]
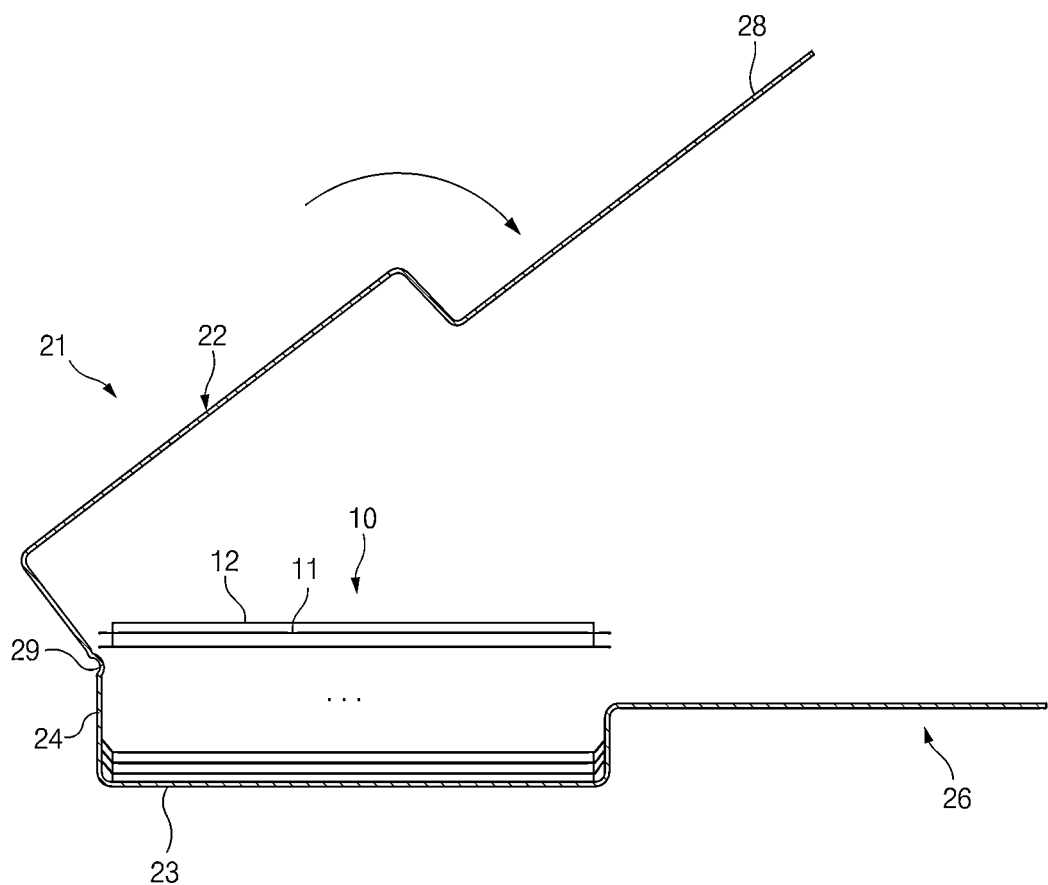

[FIG. 3]
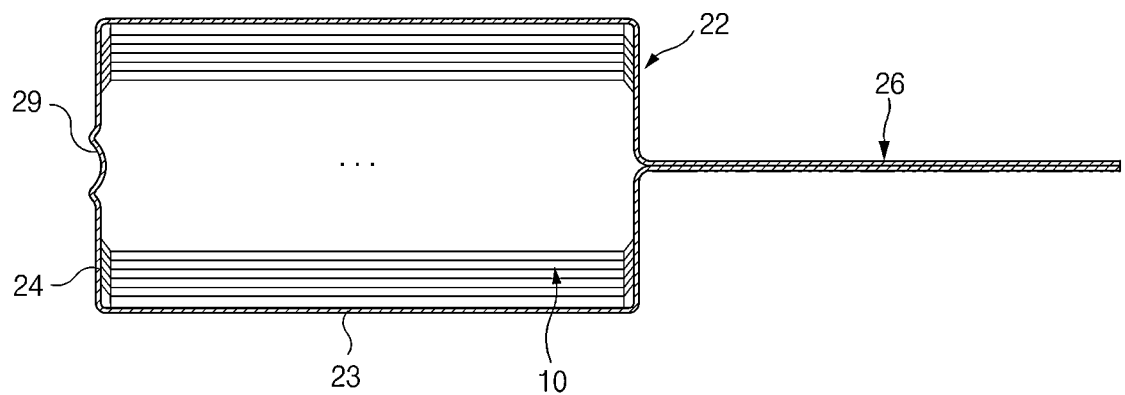

【FIG. 4】
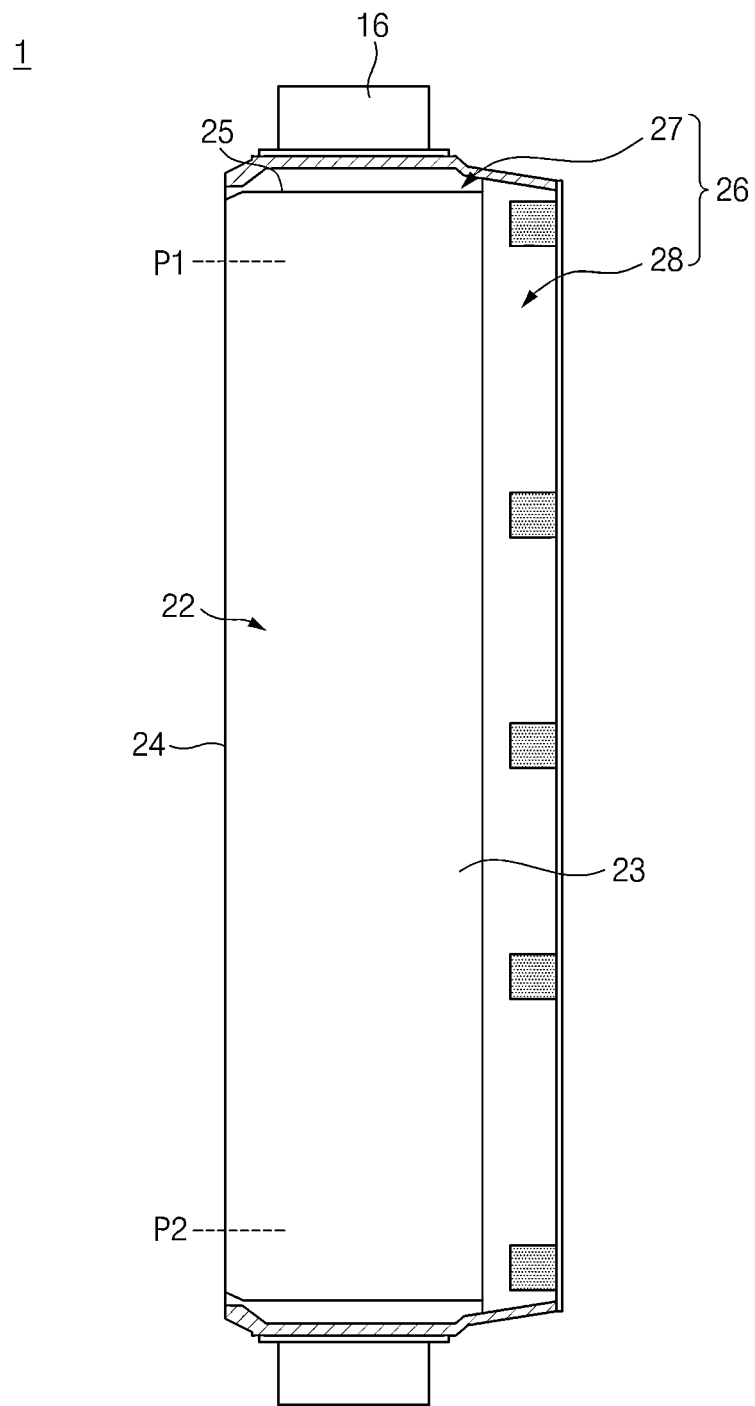

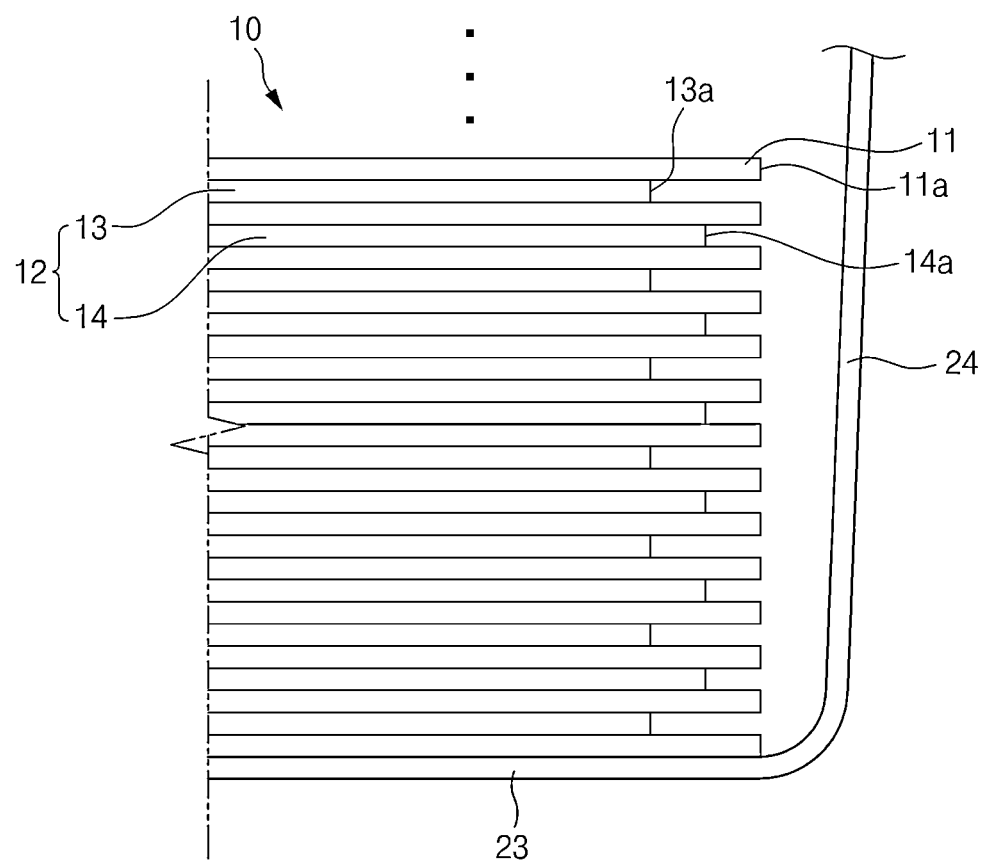
[FIG. 5]

[FIG. 6]
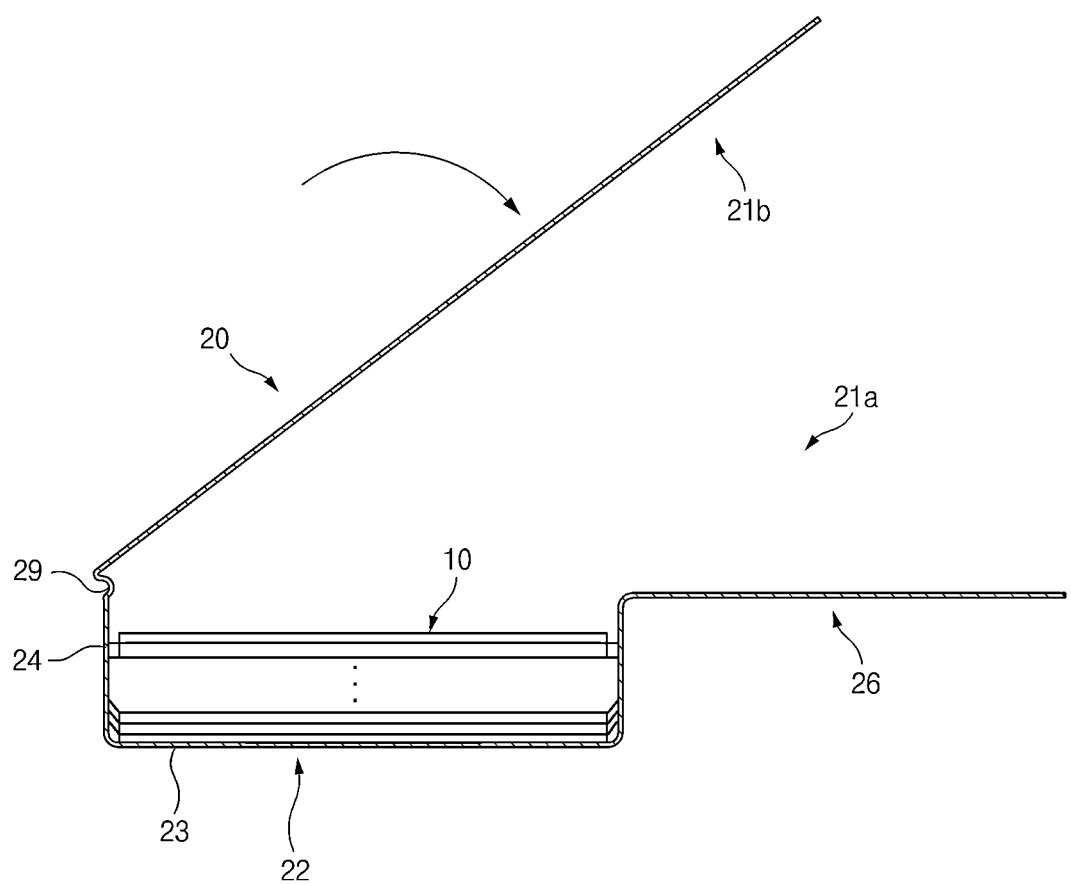

[FIG. 7]
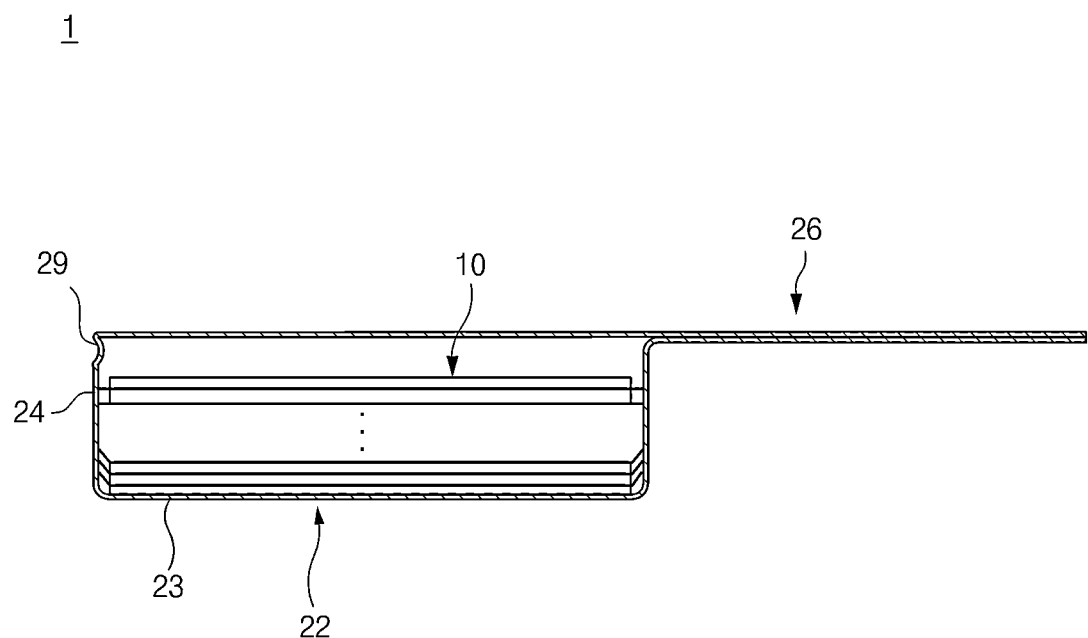

[FIG. 8]
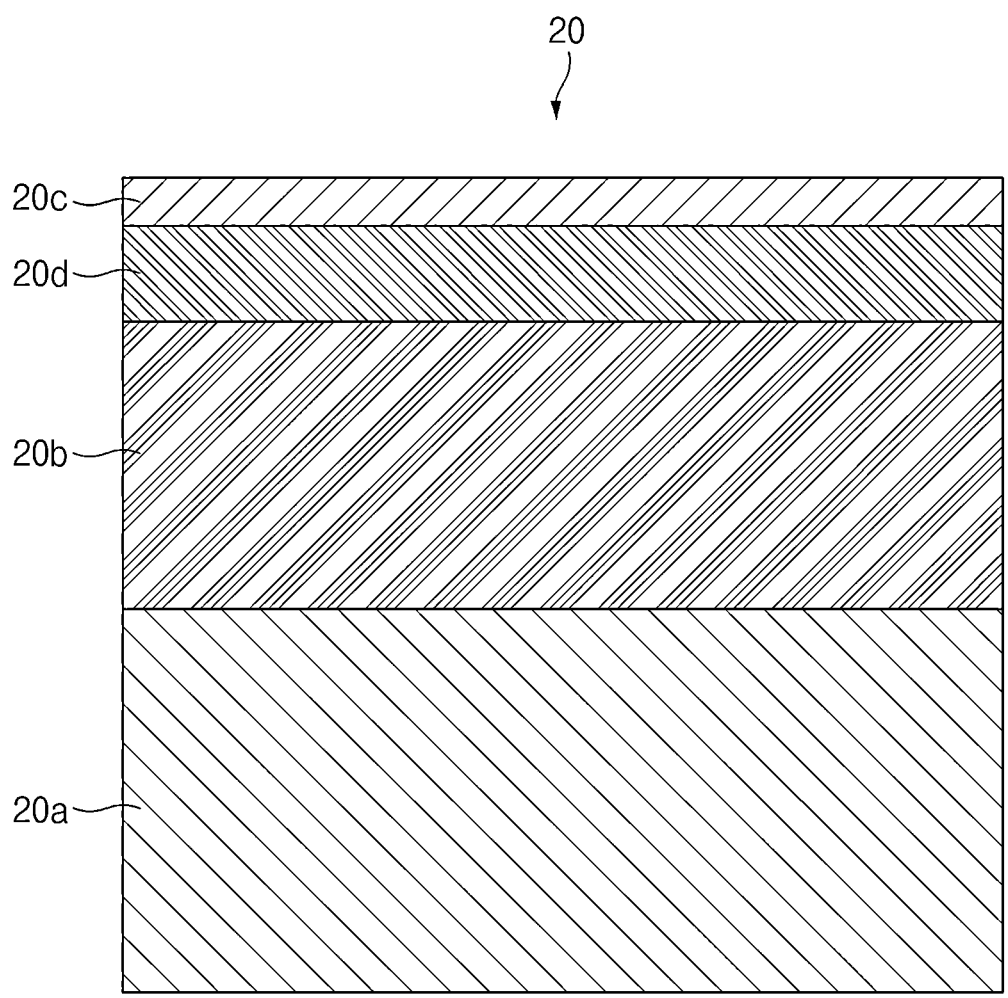

[FIG. 9]
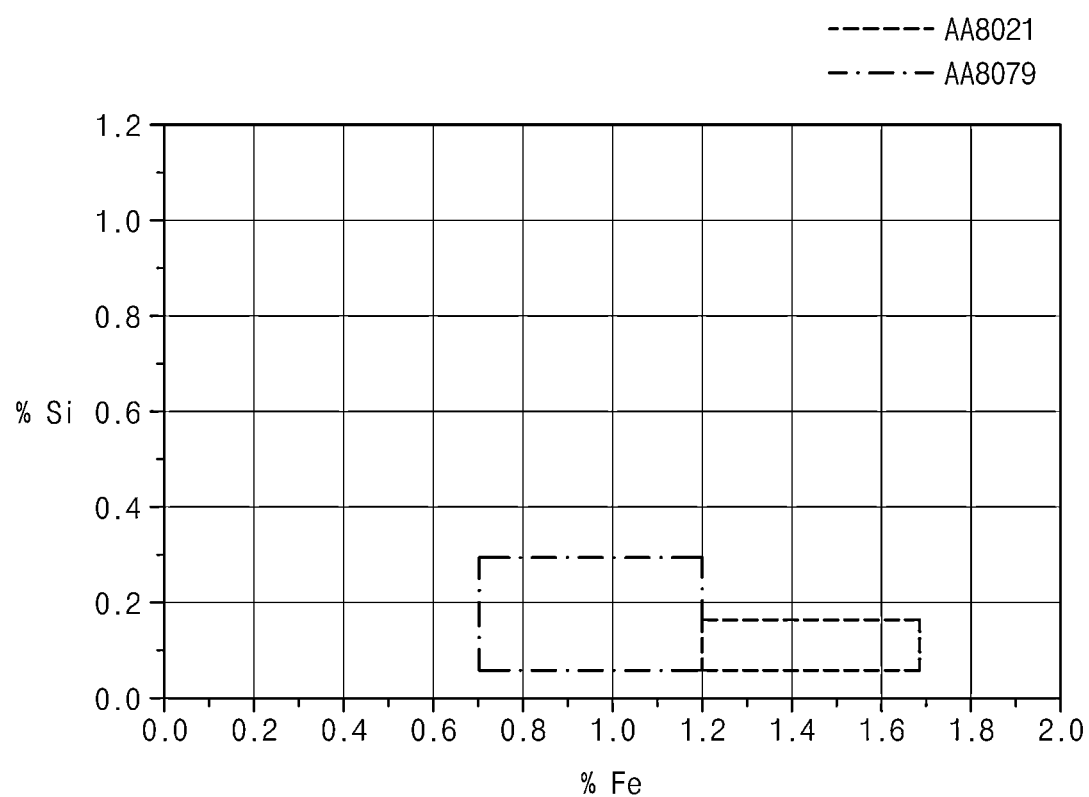

[FIG. 10]
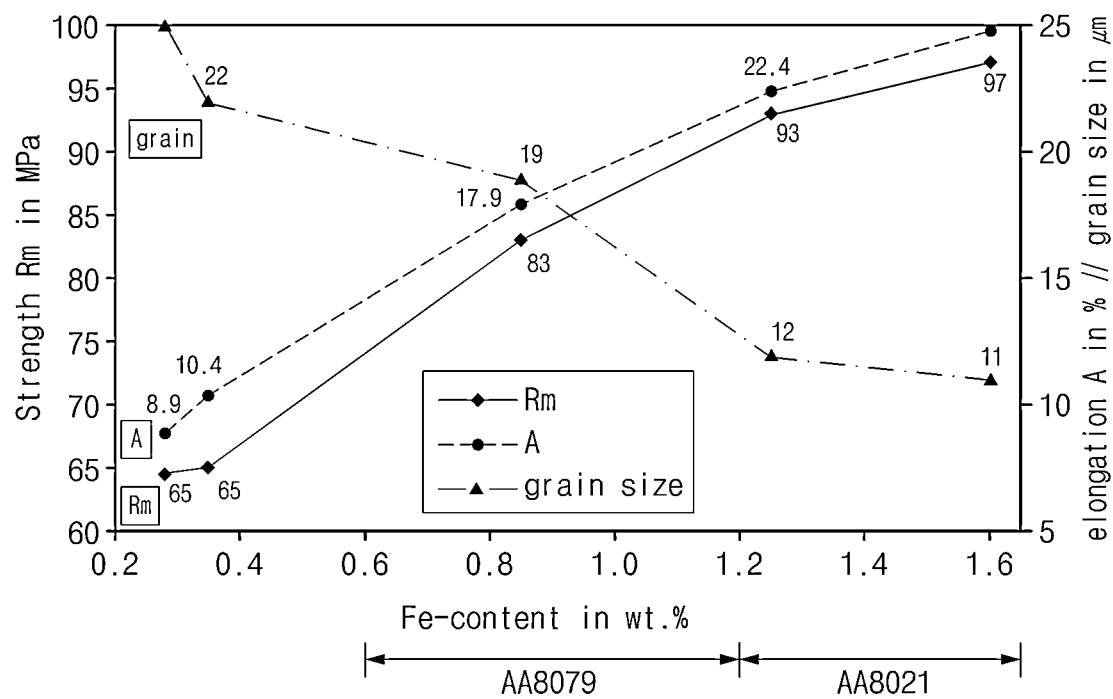

[FIG. 11]
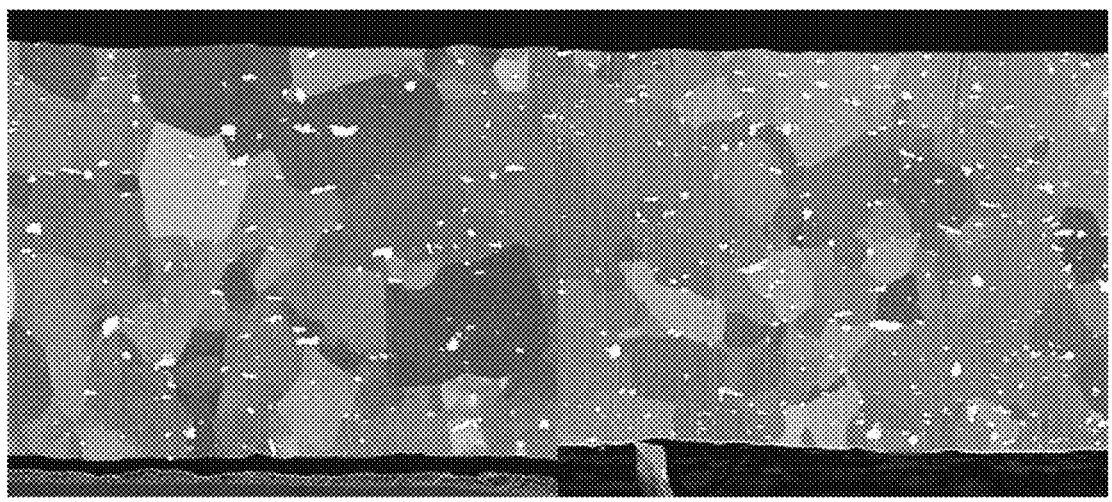

[FIG. 12]
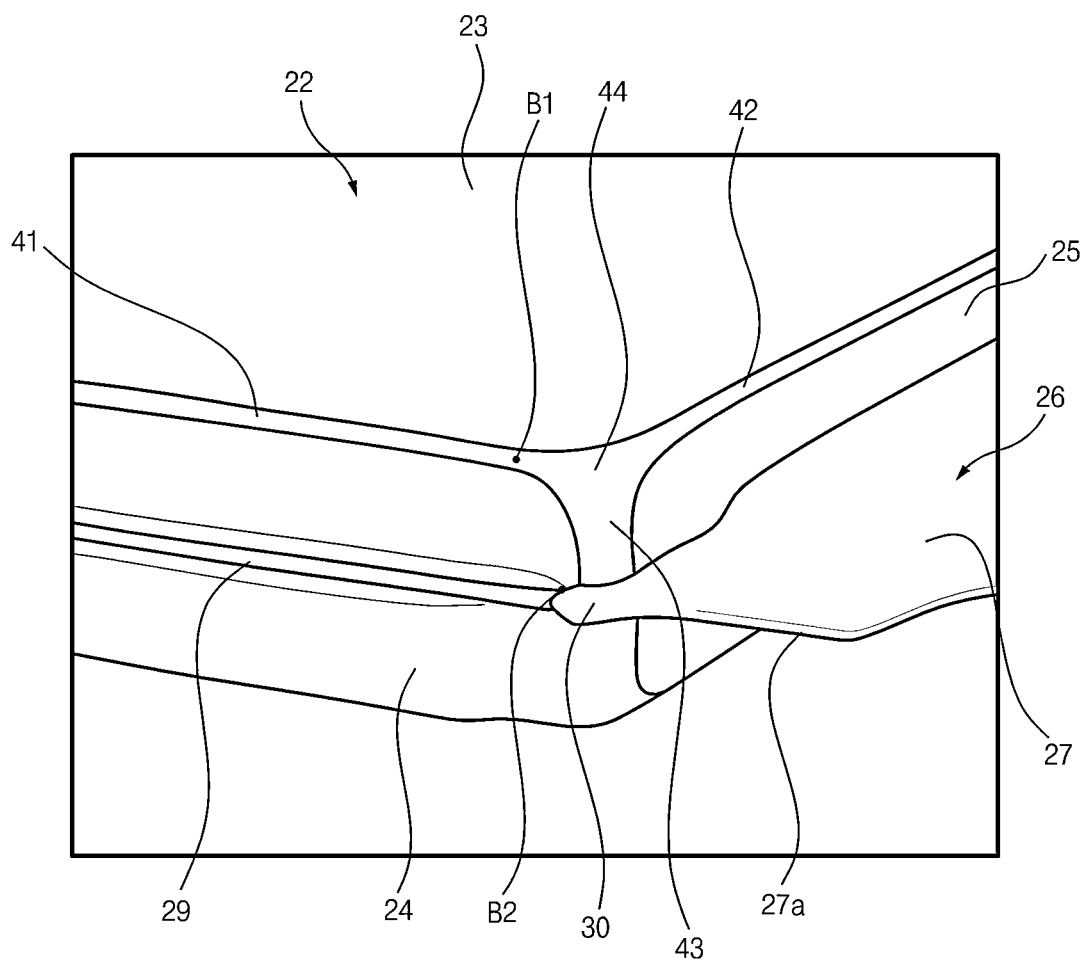

[FIG. 13]
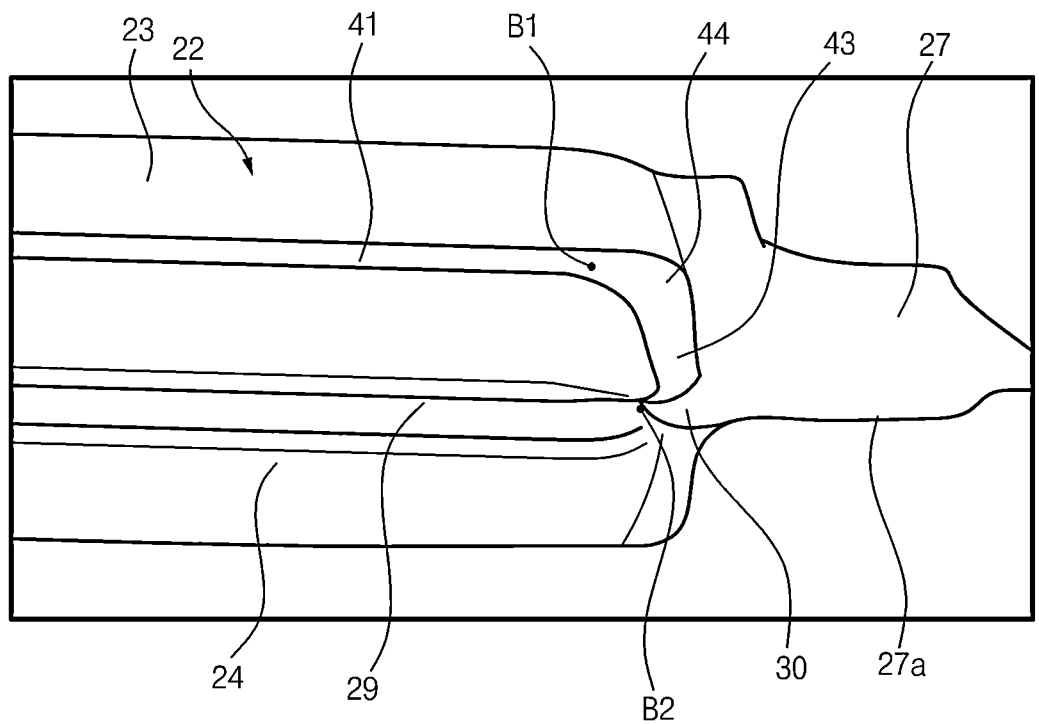

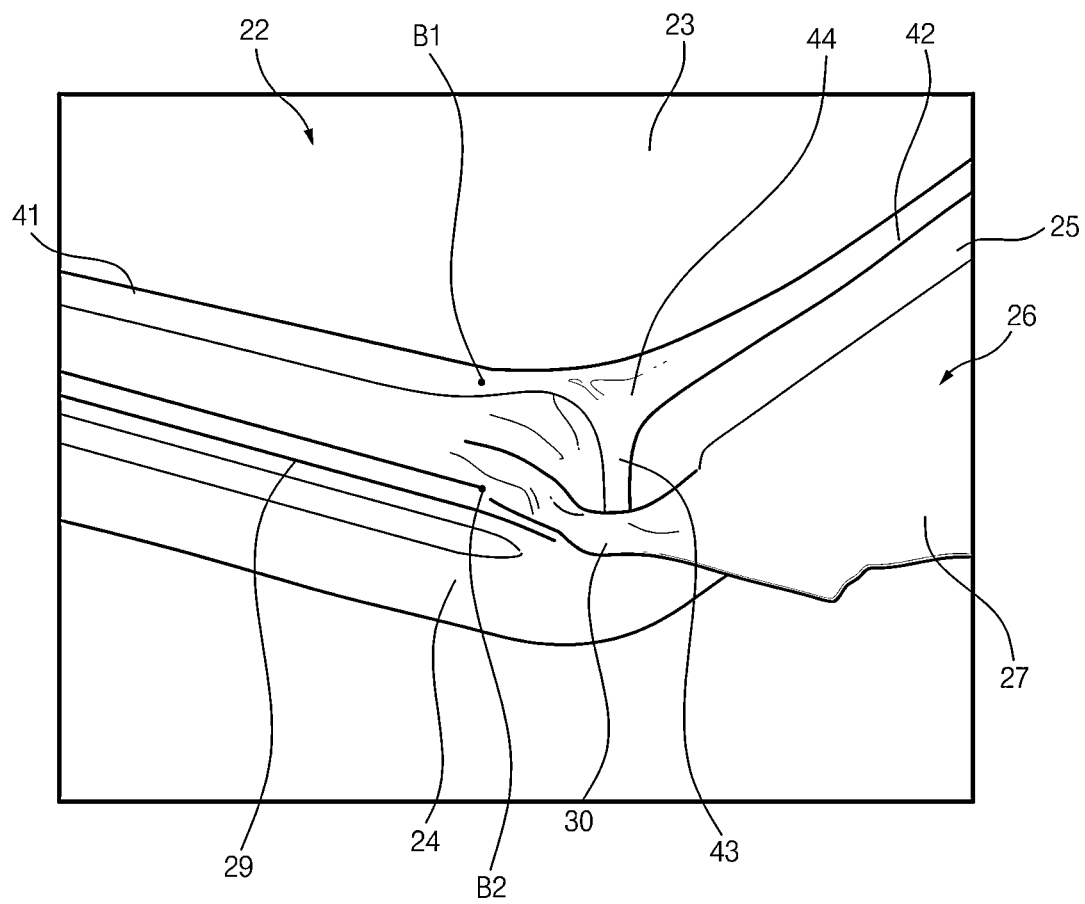
[FIG. 14]

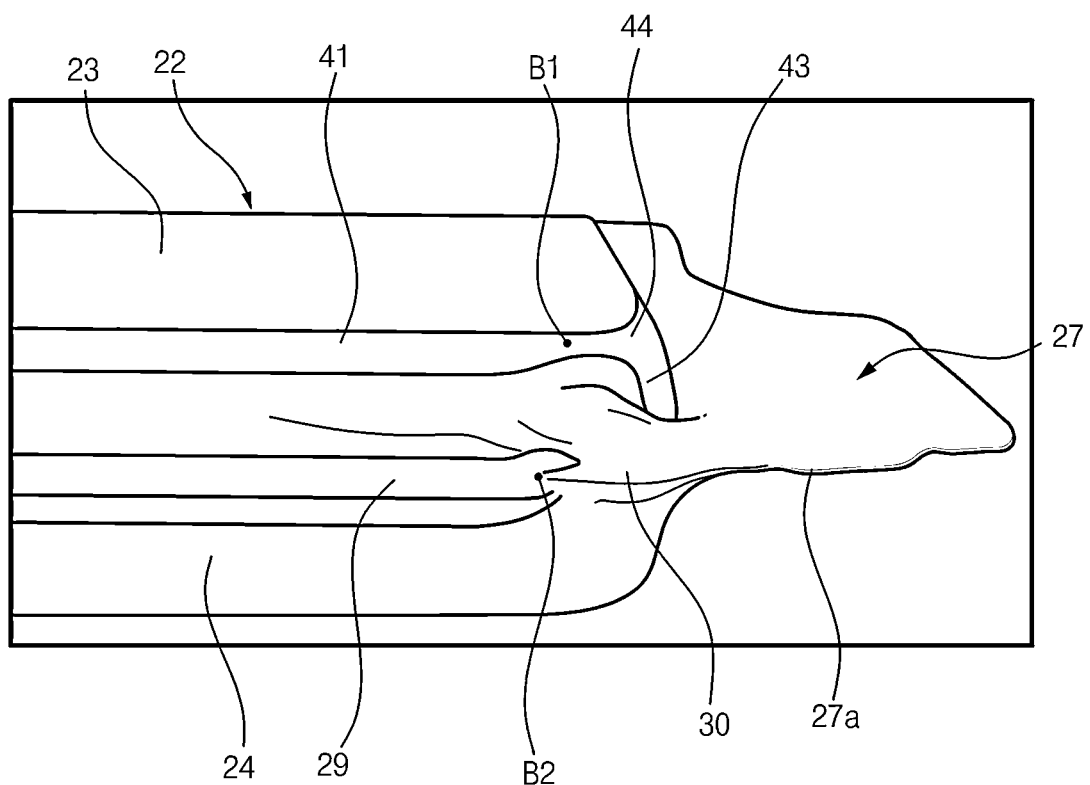
[FIG. 15]

[FIG. 16]
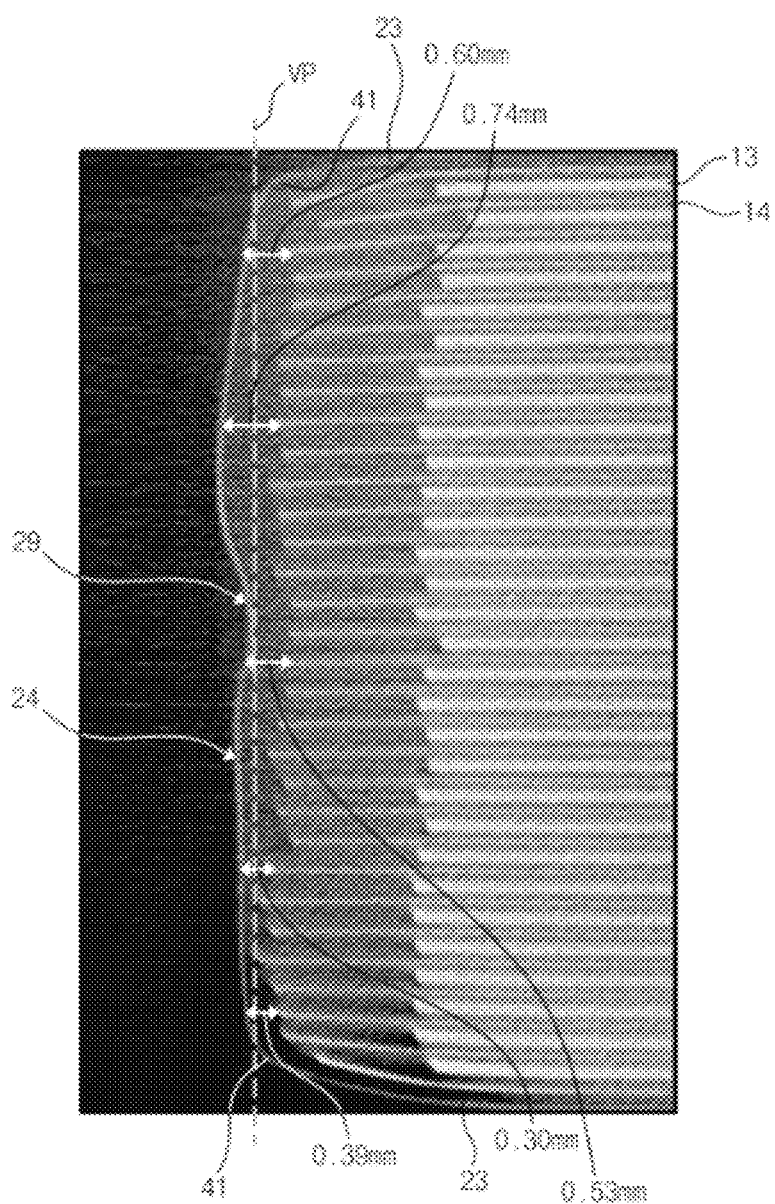

[FIG. 17]
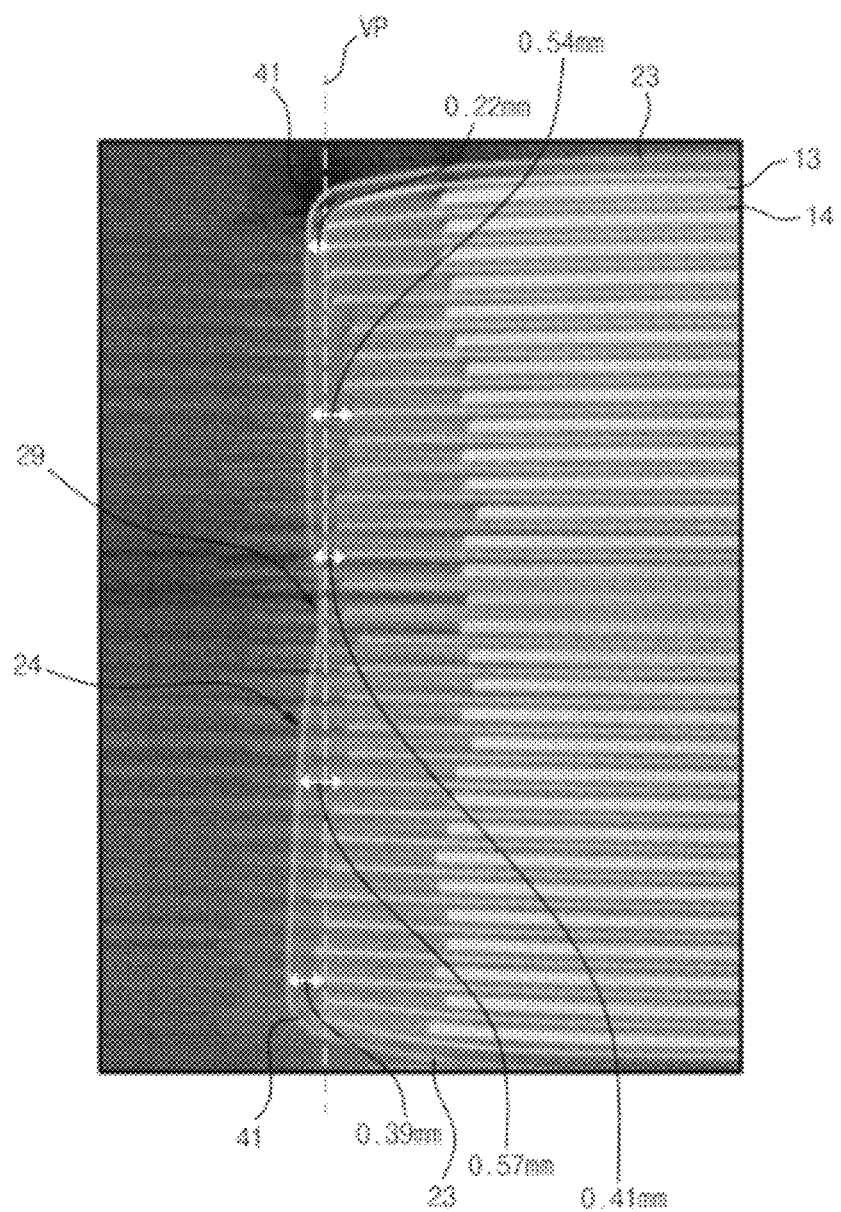

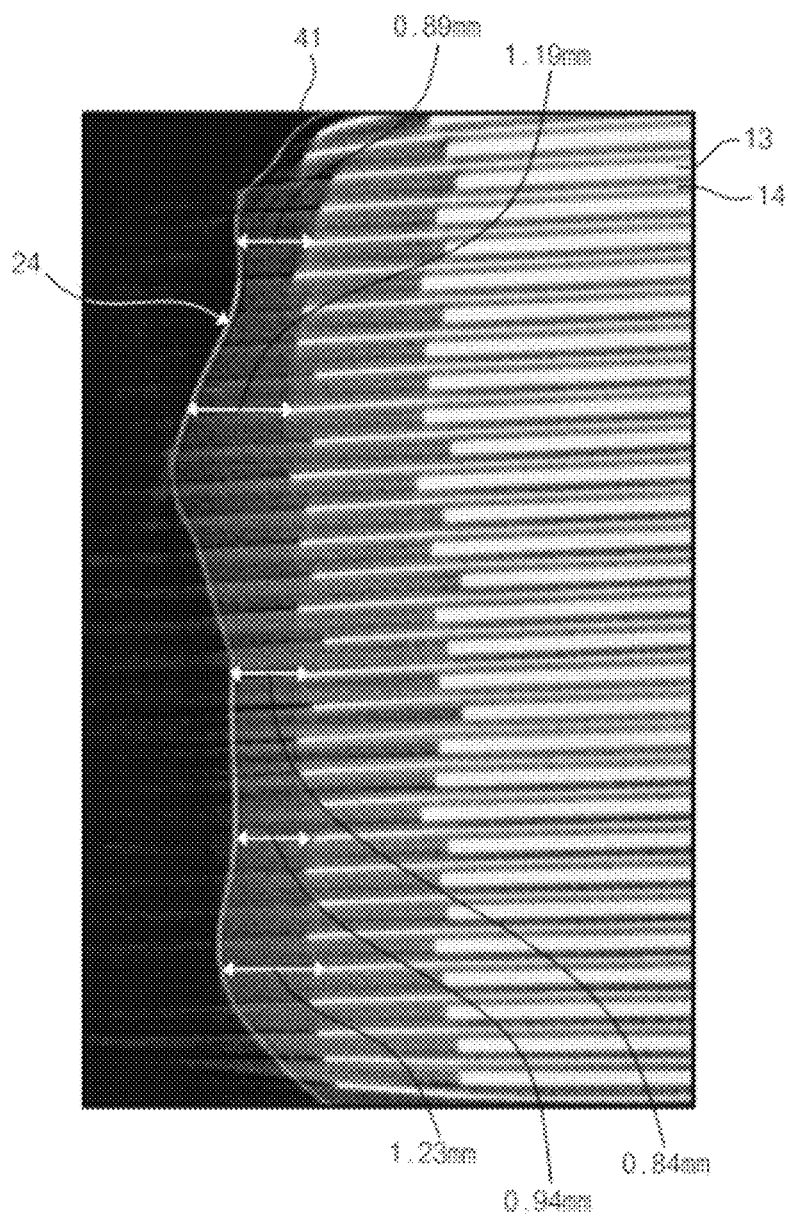
[FIG. 18]

[FIG. 19]
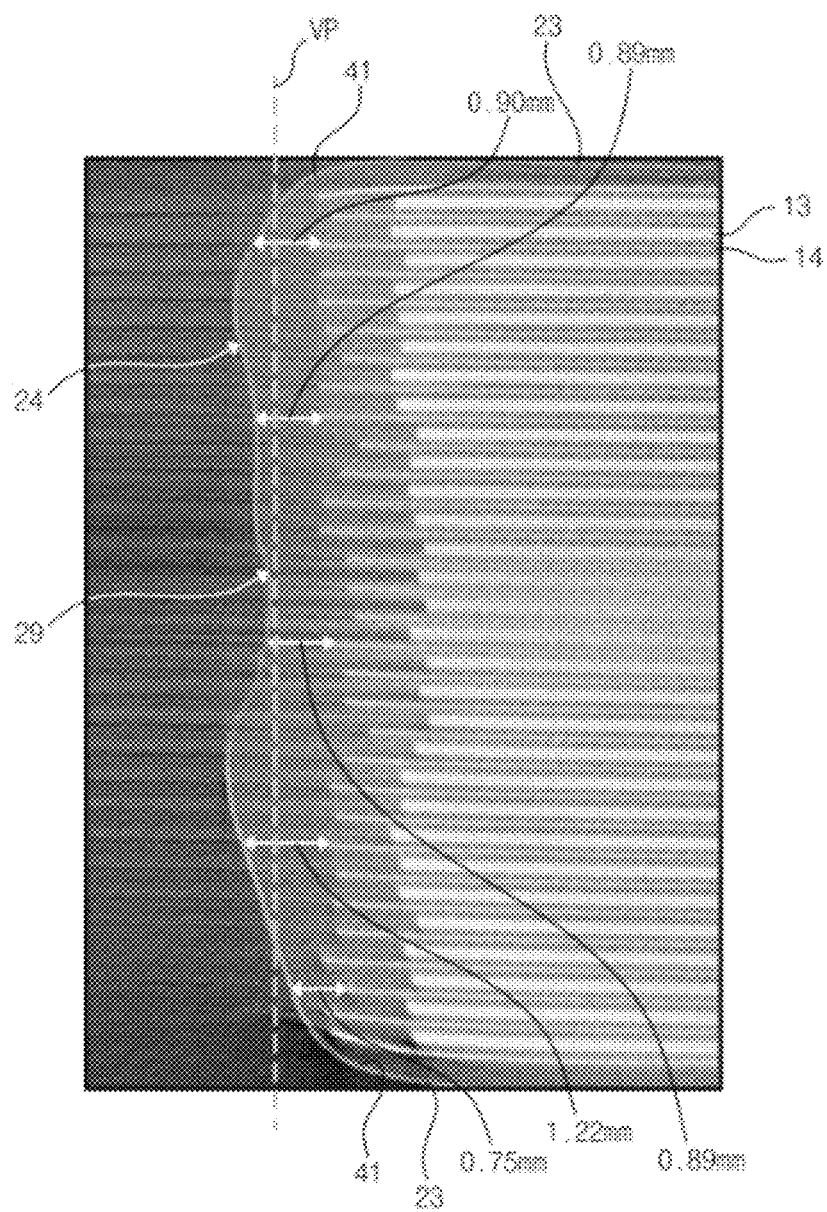

[FIG. 20]
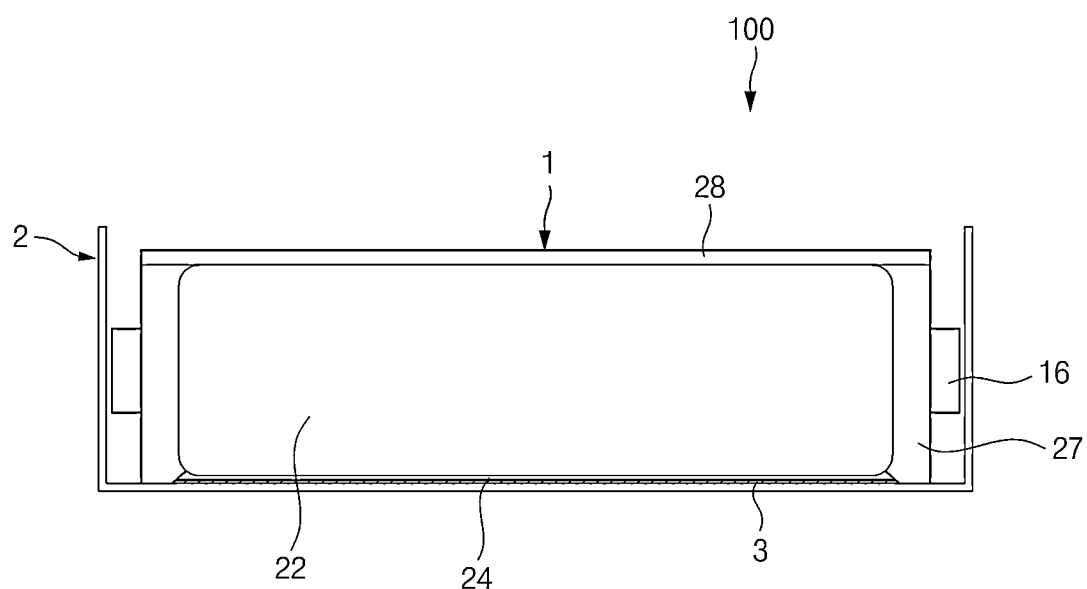

POUCH-TYPE SECONDARY BATTERY AND BATTERY MODULE HAVING THE SAME

CROSS-REFERENCE TO RELATED APPLICATIONS

This application claims the priority of Korean Patent Application No. 10-2021-0041419 filed on Mar. 30, 2021, in the Korean Intellectual Property Office, the disclosure of which is incorporated herein by reference.

BACKGROUND OF THE INVENTION

Field of the Invention

The present invention relates to a pouch-type secondary battery and a battery module having the same.

Description of the Related Art

In general, there are several types of secondary batteries such as nickel cadmium batteries, nickel hydrogen batteries, lithium ion batteries, and lithium ion polymer batteries. These secondary batteries have been applied to and used for not only small products such as digital cameras, P-DVDs, MP3Ps, cellular phones, PDAs, portable game devices, power tools, and E-bikes, but also large products requiring high power such as electric vehicles and hybrid vehicles, and power storage devices or backup-power storage devices for storing surplus generated power and new renewable energy.

In order to manufacture the secondary batteries, electrode active material slurry is first applied to a positive electrode collector and a negative electrode collector to manufacture a positive electrode and a negative electrode, and then the positive electrode and the negative electrode are stacked on both sides of a separator to form an electrode assembly having a predetermined shape. Subsequently, the electrode assembly is accommodated in a battery case, and the battery case is sealed and an electrolyte is injected therein.

Secondary batteries are classified into a pouch type, a can type, or the like according to a material of a case that accommodates the electrode assembly. In the pouch type, the electrode assembly is accommodated in a pouch made of a flexible polymer material. Also, in the can type, the electrode assembly is accommodated in a case made of a metal, a plastic material, or the like.

The pouch, which is a case of the pouch-type secondary battery, is manufactured by forming a cup through press processing on a flexible pouch film. Then, after the cup has been formed, the electrode assembly is accommodated in an accommodation space of the cup, and sides thereof are sealed. Through this process, the secondary battery is manufactured.

The pouch is formed by a press process in which: a pouch film is inserted into a forming apparatus such as a press machine; and the pouch film is pressed and drawn by a punch. The pouch film is made of a plurality of layers including a metal moisture barrier layer positioned as an inner of the pouch. However, according to the related art, metal moisture barrier layers often have larger grain sizes and smaller thickness. Thus, the formability of the related art moisture barrier layer is deteriorated. When forming a cup in a pouch film, there is a limitation in improving the thickness of a bridge and the width of a folding portion while forming a deep cup. Also, there is a limitation in reducing the size of a bat ear, and thus, the energy density compared to the volume of the secondary battery is deteriorated. Furthermore, it is difficult to manufacture a secondary battery having an overall sharp shape. Thus, the appearance is not aesthetically pleasing, and the commercial value deteriorates.

SUMMARY OF THE INVENTION

An aspect of the present invention provides a pouch-type secondary battery in which aesthetically pleasing appearance and high energy density are achieved by minimizing a distance between an electrode of an electrode assembly and a pouch.

Another aspect of the present invention provides a battery module in which cooling efficiency of a secondary battery is enhanced by minimizing a distance between an electrode of an electrode assembly and a pouch.

According to an aspect of the present invention, there is provided a pouch-type secondary battery including: an electrode assembly including positive electrodes and negative electrodes alternately stacked with separators therebetween; and a pouch including a pair of cases integrally connected to each other at a folding portion. The pouch including walls defining a perimeter of an accommodation portion for forming accommodating the electrode assembly, the walls including: a folding portion-side outer wall including the folding portion; and a sealing portion-side outer wall connected to a sealing portion at which the pair of cases are fused together. An average distance between ends of the negative electrodes and the folding portion-side outer wall may be approximately equal to or less than 0.6 mm.

With respect to a plurality of locations spaced apart from each other in a longitudinal direction of the folding portion-side outer wall, the average distance between the ends of the negative electrodes and the folding portion-side outer wall may be about 0.6 mm or less, and the total average distance may be about 0.5 mm or less.

The maximum distance between the ends of the negative electrodes and the folding portion-side outer wall is approximately equal to or less than 0.8 mm.

The ends of the negative electrodes may protrude further toward the folding portion-side outer wall than ends of the positive electrodes, and the average distance between the ends of the negative electrodes and the folding portion-side outer wall may be less than an average distance between the ends of the negative electrodes and the ends of the positive electrodes.

A distance between each of the ends of the negative electrodes and the folding portion-side outer wall may be less than half a distance between each of the ends of the negative electrodes and each of the ends of the positive electrodes.

The folding portion may have a groove shape extending from one end to another end of the folding portion-side outer wall.

The accommodation portion may include: a first rounded edge connecting a top or bottom surface of the accommodation portion to the folding portion-side outer wall; a second rounded edge connecting the top surface or the bottom surface of the accommodation portion to the sealing portion-side outer wall; a third rounded edge connecting the folding portion-side outer wall to the sealing portion-side outer wall; and a corner to which the first rounded edge, the second rounded edge, and the third rounded edge are connected.

A virtual plane, which is in contact with an innermost side of the folding portion and oriented parallel to a stacking direction of the electrode assembly, may pass through at least one of the top surface, the bottom surface, or the first edge of the accommodation portion.

A radius of curvature of the third rounded edge may be greater than a radius of curvature of the first rounded edge and a radius of curvature of the second rounded edge.

A radius of curvature of the corner may increase in a direction from a peripheral region to a central region.

The pouch may include a protrusion portion which connects an edge of the sealing portion to the folding portion and protrudes further than the edge of the sealing portion in a width direction of the accommodation portion, and a boundary between the protrusion portion and the folding portion may be positioned further outward, in a longitudinal direction of the folding portion, than a boundary between the first edge and the corner.

The pouch may be manufactured by forming a pouch film. The pouch film may include: a sealant layer made of a first polymer and formed as an innermost layer; a surface protection layer made of a second polymer and formed as an outermost layer; and a moisture barrier layer provided between the surface protection layer the sealant layer, the moisture barrier layer being formed of a metal including an alloy no. AA80XX series aluminum alloy. A thickness of the moisture barrier layer may be between about 50 μm and about 80 μm, and a thickness of the sealant layer may be between about 60 μm and about 100 μm.

The alloy no. of the aluminum alloy may be AA8021.

The aluminum alloy may include between about 1.3 wt % and about 1.7 wt % of iron and about 0.2 wt % or less of silicon, and may have a grain size of between about 10 μm and about 13 μm.

The thickness of the moisture barrier layer may be between about 55 μm and about 65 μm, and the thickness of the sealant layer may be about 75 μm to about 85 μm.

The pouch film may further include a drawing assistance layer stacked between the surface protection layer and the moisture barrier layer, the drawing assistance layer including a third polymer.

A thickness of the drawing assistance layer may be between about 20 μm and about 50 μm.

A battery module, includes housing; a plurality of the pouch-type secondary batteries stacked vertically within the housing; and a cooling unit provided on a bottom surface inside the housing and configured to cool the plurality of the pouch-type secondary batteries.

According to another aspect of the present invention, there is provided a pouch-type secondary battery including: an electrode assembly including positive electrodes and negative electrodes alternately stacked with separators therebetween; and a pouch including a pair of cases integrally connected to each other at a folding portion. The pouch includes outer walls forming a perimeter of the accommodation portion may include: a folding portion-side outer wall including the folding portion; and a sealing portion-side outer wall connected to a sealing portion at which the pair of cases are fused together. Ends of the plurality of negative electrodes protrude further toward the folding portion-side outer wall than ends of the plurality of positive electrodes protrude toward the folding portion-side, and a distance between each of the ends of the negative electrodes and the folding portion-side outer wall may be less than half a distance between each of the ends of the negative electrodes and each of the ends of the positive electrodes.

According to another aspect of the present invention, there is provided the battery module including: a housing; a plurality of secondary batteries which are stacked vertically within the housing

BRIEF DESCRIPTION OF THE DRAWINGS

The above and other aspects, features and other advantages of the present invention will be more clearly understood from the following detailed description taken in conjunction with the accompanying drawings, in which:

FIG. 1 is an exploded view of a pouch-type secondary battery according to an embodiment of the present invention;

FIG. 2 is a schematic view showing a pouch according to an embodiment of the present invention being folded;

FIG. 3 is a schematic view showing the pouch of FIG. 2 after it has been folded;

FIG. 4 is a plan view of a pouch-type secondary battery according to an embodiment of the present invention;

FIG. 5 is an enlarged schematic view of the surroundings of a folding portion-side outer wall within a pouch-type secondary battery according to an embodiment of the present invention;

FIG. 6 is a schematic view showing a pouch according to another embodiment of the present invention being folded;

FIG. 7 is a schematic view of the pouch of FIG. 6 after it has been folded;

FIG. 8 is a cross-section view of a pouch film according to an embodiment of the present invention;

FIG. 9 is a graph showing the iron and silicon contents in each of an alloy no. AA8079 aluminum alloy and an alloy no. AA8021 aluminum alloy;

FIG. 10 is a graph showing changes in a tensile strength, an elongation rate, and a grain size according to the iron content in each of the alloy no. AA8079 aluminum alloy and the alloy no. AA8021 aluminum alloy;

FIG. 11 is an enlarged SEM image of grains of each of the alloy no. AA8079 aluminum alloy and the alloy no. AA8021 aluminum alloy;

FIG. 12 is a partial perspective view illustrating a portion of a pouch-type secondary battery according to an embodiment of the present invention;

FIG. 13 is a partial side view of the pouch-type secondary battery of FIG. 12;

FIG. 14 is a partial perspective view illustrating an appearance of a pouch-type secondary battery according to the related art;

FIG. 15 is a partial view of the pouch-type secondary battery of FIG. 14;

FIGS. 16 and 17 are CT images showing a distance between a folding portion-side outer wall and a negative electrode according to an embodiment of the present invention;

FIGS. 18 and 19 are CT images showing a distance between a folding portion-side outer wall and a negative electrode according to the related art; and FIG. 20 is a schematic view of a battery module according to an embodiment of the present invention.

DETAILED DESCRIPTION OF THE PREFERRED EMBODIMENT

Hereinafter, embodiments of the present invention will be described in detail with reference to the accompanying drawings so as to be easily carried out by a person skilled in the art to which the present invention pertains. However, the present invention may be implemented in various different forms, and is neither limited nor restricted to the following embodiment.

In order to clearly describe the present invention, parts irrelevant to the description are omitted, and descriptions related to well-known functions or configurations are ruled out so as not to unnecessarily obscure subject matter of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. As used herein, the terms "substantially," "generally," "approximately," and "about" are intended to mean that slight deviation from absolute are included within the scope of the term so modified.

FIG. 1 is an exploded view of a pouch-type secondary battery according to an embodiment of the present invention, and FIG. 2 is a schematic view showing a pouch according to an embodiment of the present invention being folded.

A pouch-type secondary battery 1 (hereinafter, referred to as a 'secondary battery') according to the present invention may include an electrode assembly 10 and a pouch 20 that accommodates the electrode assembly 10.

The electrode assembly 10 may be formed by alternately stacking separators 11 and electrodes 12. In more detail, the electrodes 12 may include positive electrodes 13 and negative electrodes 14 (see FIG. 5), and the positive electrodes 13 and the negative electrodes 14 may be alternately stacked with separators 11 therebetween.

Each of the electrodes 12 may be formed by applying an active material slurry onto an electrode collector having a metal foil or a metal mesh. In each of the positive electrodes 13, the electrode collector may include an aluminum material. In each of the negative electrodes 14, the electrode collector may include a copper material.

Electrode tabs 15 may be provided in the electrode assembly 10. An electrode tabs 15 is connected to each of the positive electrode 13 and the negative electrode 14 of the electrode assembly 10, and protrudes outward from the electrode assembly 10, thereby providing a path through which electrons may move between the inside and the outside of the electrode assembly 10.

The plurality of electrode tabs 15 connected to the positive electrodes 13 and the plurality of electrode tabs 15 connected to the negative electrodes 14 may protrude in opposite directions of the electrode assembly 10. However, the embodiment is not limited thereto, and the plurality of electrode tabs 15 connected to the positive electrodes 13 and the plurality of electrode tabs 15 connected to the negative electrodes 14 may alternatively protrude in the same direction of the electrode assembly 10 in a side-by-side manner.

Electrode leads 16, which supply electricity to the outside of the secondary battery 1, are connected to the plurality of electrodes tab 15 through spot welding or the like. One end of an electrode lead 16 is connected to the plurality of electrode tabs 15, and the other end of the electrode lead 16 protrudes outward from the pouch 20.

A portion of the electrode leads 16 may be surrounded by insulating parts 17. For example, each of the insulating parts 17 may include an insulating tape. The insulating part 17 may be positioned between a pair of terraces 26 of the pouch 20 which will be described later, and the pair of terraces 26 may be heat-fused to each other. In this state, a portion of the pair of terraces 26 may be heat-fused with the insulating part 17. Thus, the insulating part 17 prevents the electricity generated from the electrode assembly 10 from flowing to the pouch 20 via the electrode lead 16 and maintains the sealing of the pouch 20.

Meanwhile, the pouch 20 may be formed by sealing a pair of cases 21 which are connected to each other by a folding portion 29. Hereinafter, the structure of each case 21 will be described when the pouch 20 is in an unfolded state. The 'unfolded state' represents a state in which the pouch 20 is spread out prior to being folded.

Each cases 21 may include a cup 22 having a recessed shape and a terrace 26 positioned around the cup 22.

The cup 22 may be recessed from the terrace 26 to a predetermined depth to form a recessed space S1.

The cups 22 of the pair of cases 21 may be connected to each other by the folding portion 29. That is, the folding portion 29 may be positioned between the pair of cups 22, and the folding portion 29 may be referred to as a bridge when the pouch 20 is unfolded. The folding portion 29 extends parallel to the longitudinal direction of the pouch 20.

After the electrode assembly 10 is accommodated in the recessed space S1 of one of the cups 22, one case 21 is folded over the folding portion 29 to face and engage the other cup 21. That is, one of the cups 22 may cover the electrode assembly 10 from above. Put another way, the recessed spaces S1 of the cups 22 communicate with each other, and the electrode assembly 10 is accommodated in the recessed spaces S1.

The recess depths of the pair of cups 22 may be equal to each other. In this case, the pair of cups 22 may have symmetrical shapes. However, the embodiment is not limited thereto, and the recess depths of the pair of cups 22 may be different from each other. In this case, the pair of cups 22 may have asymmetrical shapes.

In more detail, each cup 22 may include a bottom portion 23 and peripheral portions 24 and 25.

The bottom portion 23 may be formed in parallel to the terrace 26.

The peripheral portions 24 and 25 may surround the recessed space S1 in conjunction with the bottom portion 23. In more detail, the peripheral portions 24 and 25 may include a first surface 24 connected to the folding portion 29 and a plurality of second surfaces 25 connected to the terrace 26. The three second surfaces 25 connected to each other may be provided to form a 'U' shape.

The terrace 26 may be positioned around the cup 22. In more detail, the terrace 26 may be connected to upper ends of the plurality of second surfaces 25 of the cup 22. Thus, the terrace 26 may have an approximate 'U' shape.

In more detail, the terrace 26 may include an expansion portion 28 positioned on the opposite side from the folding portion 29 with respect to the cup 22 and a pair of sides 27 connecting the folding portion 29 to the expansion portion 28.

The expansion portion 28 may extend parallel to the longitudinal direction of the pouch 20. The pair of sides 27 may extend parallel to the width direction of the pouch 20 and may be positioned on the opposite sides from each other with respect to the cup 22. In other words, the pair of sides 27 connect the expansion portion 28 to the folding portion 29.

FIG. 3 is a schematic plan view showing a pouch according to an embodiment of the present invention being folded, and FIG. 4 is a schematic plan view of the pouch-type secondary battery after it has been folded.

To form the secondary battery 1, the electrode assembly 10 is disposed within the cups 22 of the pouch 20, the folding portion 29 is folded, and the pair of terraces 26 are fused to each other.

More specifically, the secondary battery 1 may include an accommodation portion which accommodates the electrode assembly 10 and a sealing portion in which the pair of cases 21 are fused to each other.

The accommodation portion is formed as the cups 22 of the pair of cases 21 communicate with each other, and hereinafter, the accommodation portion is denoted for convenience by a reference numeral '22' that is the same reference numeral as the cup 22. Also, the sealing portion is formed as the terraces 26 of the pair of cases 21 are fused to each other, and hereinafter, the sealing portion is denoted for convenience by a reference numeral '26' that is the same reference numeral as the terrace.

The accommodation portion 22 may include: a bottom surface and a top surface which cover the electrode assembly 10 from both sides with respect to the stacking direction of the electrode assembly 10; and a plurality of outer walls which form the perimeter of the accommodation portion 22 and surround the electrode assembly 10. The plurality of outer walls may include a folding portion-side outer wall including the folding portion 29 and a sealing portion-side outer wall connected to the sealing portion 26.

In more detail, the bottom surface of the accommodation portion 22 may be formed by the bottom portion 23 of one of the cups 22, and the top surface of the accommodation portion 22 may be formed by the bottom portion 23 of the other one of the cups 22. Hereinafter, the bottom surface and the top surface of the accommodation portion 22 are denoted by a reference numeral 23 that is the same reference numeral as the bottom portion 23 of the cup 22.

Also, the folding portion-side outer wall of the accommodation portion 22 may be formed by the first surfaces 24 of the pair of cups 22 and the folding portion 29. Hereinafter, the folding portion-side outer wall of the accommodation portion 22 is denoted by a reference numeral '24' that is the same reference numeral as the first surface 24 of the cup 22.

When the cups 22 of the pair of cases 21 have the same or similar depth, the folding portion 29 may be position in a central region of the folding portion-side outer wall 24 with respect to the stacking direction of the electrode assembly 10.

Also, the sealing portion-side outer wall of the accommodation portion 22 may be formed by the second surfaces 25 of the pair of cups 22. Hereinafter, the sealing portion-side outer wall of the accommodation portion 22 is denoted by a reference numeral '25' that is the same reference numeral as the second surface 25 of the cup 22.

Thus, the folding portion-side outer wall 24 may form a portion of the perimeter of the accommodation portion 22, and the sealing portion-side outer wall 25 may form another portion of the perimeter of the accommodation portion 22. The folding portion-side outer wall 24 may include the folding portion 29, and the sealing portion-side outer wall 25 may be connected to the sealing portion 26.

The sealing portion 26 may include a first sealing portion in which the sides 27 of the pair of cases 21 are fused to each other and a second sealing portion in which the expansion portions 28 of the pair of cases 21 are fused to each other. Hereinafter, the first sealing portion is denoted by a reference numeral '27' that is the same reference numeral as the side 27, and the second sealing portion is denoted by a reference numeral '28' that is the same reference numeral as the expansion portion 28.

The first sealing portion 27 extends in the width direction of the secondary battery 1, and a pair of first sealing portions 27 may be provided on the opposite sides from each other with the accommodation portion 22 therebetween. The electrode leads 16 may protrude outward from the pouch 20 via the first sealing portions 27.

The second sealing portion 28 extends in the longitudinal direction of the secondary battery 1 and may protrude away from the folding portion-side outer wall 24. The second sealing portion 28 may be folded upon itself at least once and toward the accommodation portion 22, and thus, the width of the secondary battery 1 may be reduced. For example, the second sealing portion 28 may be folded twice in a double side folding (DSF) method.

FIG. 5 is a partial, cross-sectional schematic view illustrating the surroundings of the folding portion-side outer wall of the pouch-type secondary battery according to an embodiment of the present invention.

In the electrode assembly 10, the negative electrodes 14 may be larger than the positive electrodes 13, and the separator 11 may be larger than the negative electrodes 14.

Thus, ends 14a of the negative electrodes 14 may protrude further toward the folding portion-side outer wall 24 than ends 13a of the positive electrodes 13, and ends 11a of the separators 11 may protrude further toward the folding portion-side outer wall 24 than ends 14a of the negative electrodes 14. The ends 11a of the separators 11 may be in contact with the folding portion-side outer wall 24.

On the other hand, the ends 14a of the negative electrodes 14 and the ends 13a of the positive electrodes 13 may be spaced apart from the folding portion-side outer wall 24. However, according to the related art, gaps between the ends 14a of the negative electrodes 14 and a folding portion-side outer wall 24 are relatively large, and thus, secondary batteries according to the related art do not have a sharp appearance.

It is thus desirable that the ends 14a of the negative electrodes 14 are minimally spaced apart from the folding portion-side outer wall 24 such that only minimal gaps exist therebetween.

To achieve this objective, the formability of a pouch film, which is formed into the pouch 20, must be improved. The pouch film may be formed into the pouch 20 through a forming process by a die and a punch. The forming process is a well-known technique, and thus, detailed description thereof will be omitted.

As the formability of the pouch film is improved, tolerance during the forming process becomes small, and precise manufacturing is possible. Thus, gaps between the ends 14a of the negative electrodes 14 and the folding portion-side outer wall 24 may be minimized. The structure of the pouch film having improved formability will be described later in detail.

FIG. 6 is a schematic view showing a pouch according to another embodiment of the present invention being folded, and FIG. 7 is a schematic view showing the pouch after it has been folded.

Hereinafter, the features overlapping those described above will be referenced using the same reference numerals, and only the differences therebetween will be mainly described.

In this embodiment, a pouch 20 may be formed by sealing a first case 21a and a second case 21b which are formed by a folding portion 29. A cup 22 may be formed in the first case 21a, but a cup 22 may not be formed in the second case 21b.

That is, the second case 21b may have a generally flat plate shape. A portion of the second case 21b may cover the cup 22 of the first case 21a, and another portion of the second case 21b may be fused to a terrace 26 of the first case 21a.

In more detail, after an electrode assembly 10 is accommodated in a recessed space S1 of the cup 22 of the first case 21a, the folding portion 29 may be folded so that the second case 21b covers the recessed space S1 from above.

Thus, in this embodiment, the bottom surface of an accommodation portion 22 of the secondary battery 1 may be formed by a bottom portion 23 of the cup 22 of the first case 21a, and the top surface of the accommodation portion 22 may be formed by a portion of the second case 21b.

A sealing portion 26 of the secondary battery 1 may be formed as the terrace 26 of the first case 21a is fused to the other portion of the second case 21b.

A folding portion-side outer wall of the accommodation portion 22 may be formed by a first surface 24 of the cup 22 of the first case 21a and the folding portion 29. Thus, the folding portion 29 may be positioned in an upper region of the folding portion-side outer wall 24 with respect to the stacking direction of the electrode assembly 10 when the first case 21a is positioned underneath the second case 21b.

Also, a sealing portion-side outer wall of the accommodation portion 22 may be formed by the second surfaces 25 of the cup 22 of the first case 21a.

FIG. 8 is a cross-sectional view of a pouch film according to an embodiment of the present invention.

The pouch film is the base material of the pouch 20. Put another way, the pouch 20 is manufactured by drawing the pouch film. Hereinafter, the pouch film is denoted for convenience by a reference numeral '20' that is the same reference numeral as the pouch 20.

The pouch film 20 includes a sealant layer 20a, a moisture barrier layer 20b, a surface protection layer 20c, and a drawing assistance layer 20d.

The sealant layer 20a may form the innermost layer of the pouch 20. In more detail, in the secondary battery 1, the sealant layer 20a may be an inner surface of the pouch 20.

The sealant layer 20a has to have insulating characteristics because the sealant layer 20a is in contact with the electrode assembly 10, and also has to have corrosion resistance because the sealant layer 20a comes into contact with an electrolyte which is injected into the accommodation portion 22 during a process for manufacturing the secondary battery 1. Also, the sealant layer 20a has to have high sealing characteristics because the sealant layer 20a has to completely seal the inside of the accommodation portion 22 to prevent the movement of materials between the inside and the outside and the pouch 20. That is, the sealing portion 26, in which the sealant layers 20a of the first case 21a and the second case 21b are bonded to each other, has to have excellent thermal bonding strength.

The sealant layer 20a may have a material of a first polymer, and the first polymer may be made of one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, polyolefin-based resin such as polypropylene (PP) or polyethylene (PE) is mainly used. Since the polypropylene (PP) has excellent mechanical properties such as tensile strength, rigidity, surface hardness, wear resistance, and thermal resistance, and excellent chemical properties such as corrosion resistance, the polypropylene is mainly used to manufacture the sealant layer 20a. In addition, casted polypropylene, acid modified polypropylene, or polypropylene-butylene-ethylene terpolymer may be used. Here, the acid modified polypropylene may be maleic anhydride polypropylene (MAH PP). Also, the sealant layer 20a may have a single layer structure, which is made of one material, or a composite layer structure, in which two or more materials constitute respective layers.

The sealant layer 20a may have a thickness of between about 60 μm and about 100 μm, and more particularly, between about 75 μm and about 85 μm. If the thickness of the sealant layer 20a is less than about 60 μm, the sealing durability may be deteriorated which, in turn, may cause the inside of the sealant layer 20a to break down when sealed. On the other hand, if the thickness of the sealant layer 20a is greater than about 100 μm, the overall thickness of the pouch becomes excessively large. Thus, the energy density to the volume of the secondary battery 1 is deteriorated instead.

The moisture barrier layer 20b may be stacked between the surface protection layer 20c and the sealant layer 20a to ensure the mechanical strength of the pouch, block a gas or moisture from entering the secondary battery 1, and prevent the electrolyte from leaking. The moisture barrier layer 20b may be made of metal, and more specifically, aluminum. The aluminum may be lightweight while ensuring at least a predetermined level of mechanical strength, and also may supplement electrochemical properties of the electrode assembly 10 and the electrolyte and ensure heat radiation and the like.

In the related art, an alloy no. AA30XX series aluminum alloy has been frequently used. However, the iron content of an alloy no. AA30XX series aluminum alloy may be equal to or less than about 0.7 wt %, and thus, the mechanical strength is low. In order to solve the above limitation, the moisture barrier layer 20b according to an embodiment of the present invention may be made of metal including an alloy no. AA80XX series aluminum alloy.

Alloy no. AA80XX series aluminum alloy may include various materials. For example, the alloy may include one or two or more materials selected from the group consisting of iron (Fe), copper (Cu), chrome (Cr), manganese (Mn), nickel (Ni), magnesium (Mg), and zinc (Zn). The aluminum alloy used to manufacture the moisture barrier layer 20b according to the embodiment of the present invention will be described later in detail.

The moisture barrier layer of the related art, has a thickness of between about 30 μm and about 50 μm, and more particularly, about 40 μm. Thus, the moisture barrier layer of the related art has low formability. Accordingly, when the pouch film is drawn, there is a limitation in forming a cup 22 to have an almost vertical peripheral portions 24 and 25 as the cup 22 is drawn deeper. There is also a limitation in reducing a radius of curvature of an edge which makes a round connection between the bottom portion 23 and the peripheral portions 24 and 25 of the cup 22.

If the thickness of the moisture barrier layer 20b is greater than about 80 μm so as to solve the above limitations, not only does the manufacturing costs increase, but the overall thickness of the pouch excessively increases. Thus, the ration of the energy density to the volume of the secondary battery 1 is deteriorated. If the thickness of the sealant layer 20a is reduced to less than about 60 μm so as to reduce the overall thickness of the pouch, the sealing durability is deteriorated as described above.

In order to solve the above limitations, the moisture barrier layer 20b of the present embodiment may have a thickness of between about 50 μm and about 80 μm, and more particularly, between about 55 μm and about 65 μm.

Thus, the formability of the moisture barrier layer 20b is enhanced such that the cup 22 may be drawn deeper when the pouch film 20 is formed. Drawing the cup 22 to a deeper depth also causes the peripheral portions 24 and 25 to become almost vertical, and the radius of curvature of the edge, which connects the bottom portion 23 and the peripheral portion 24 and 25 of the cup 22, to be reduced. Thus, since the volume of the recessed space S1 increases, a larger electrode assembly 10 may be accommodated therein, and the energy efficiency with respect to the volume of the secondary battery 1 may also increase. Also, the manufacturing costs may not significantly increase, and the entire thickness of the pouch may not significantly increase even though the thickness of the sealant layer 20a is not reduced. Moreover, the sealing durability may not be deteriorated.

The surface protection layer 20c is formed as an outermost layer of the pouch 20, and may electrically insulate the electrode assembly 10 from the outside while protecting the electrode assembly 10 from friction and collision. In more detail, in the secondary battery 1, the surface protection layer 20c is visible from an outside and thus forms the appearance of the pouch 20.

The surface protection layer 20c may be formed from a second polymer, and the second polymer may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, it is desirable to mainly use polymers having the wear resistance and thermal resistance such as polyethylene terephthalate (PET). Also, the surface protection layer 20c may have a single layer structure, which is made of one material, or a composite layer structure, in which two or more materials constitute respective layers.

According to the embodiment, the surface protection layer 20c may have a thickness of between about 5 μm and about 25 μm, and more particularly, between about 7 μm and about 12 μm. If the thickness of the surface protection layer 20c is less than about 5 μm, the external insulation may be deteriorated. On the other hand, if the thickness of the surface protection layer 20c is greater than about 25 μm, the overall thickness of the pouch becomes excessively large and the ratio of the energy density to the volume of the secondary battery 1 is deteriorated.

Meanwhile, PET is not expensive and has excellent durability and insulating properties. However, PET may be difficult to adhere to the aluminum frequently used as the moisture barrier layer 20b and may have a different behavior than the aluminum when subjected to stress from being drawn. Thus, when the surface protection layer 20c is bonded directly to the moisture barrier layer 20b, the surface protection layer 20c is susceptible to being peeled off from the moisture barrier layer 20b during the drawing process. As such, the moisture barrier layer 20b is not uniformly drawn, and thus, the formability may be deteriorated.

In order to solve the above limitations, the pouch film 20 may further include the drawing assistance layer 20d stacked between the surface protection layer 20c and the moisture barrier layer 20b.

The drawing assistance layer 20d may be stacked between the surface protection layer 20c and the moisture barrier layer 20b to prevent the surface protection layer 20c and the moisture barrier layer 20b from being peeled off when drawn.

The drawing assistance layer 20d is made of a third polymer, and the third polymer may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. Particularly, the nylon resin is easily bonded to the polyethylene terephthalate (PET) of the surface protection layer 20c and has a similar behavior, when drawn, to the aluminum alloy of the moisture barrier layer 20b. Thus, the nylon resin may be mainly used as the third polymer. Also, the drawing assistance layer 20d may have a single layer structure, which is made of one material, or a composite layer structure, in which two or more materials constitute respective layers.

The moisture barrier layer according to the related art has a thickness of about 40 μm, and accordingly, the drawing assistance layer has an extremely small thickness of about 15 μm. That is, the ratio of thicknesses between the drawing assistance layer and the moisture barrier layer is about 1:2.67, and a proportion of the moisture barrier layer to the thickness is significantly high. However, as described above, according to the embodiment described herein, the moisture barrier layer 20b has a thickness of between about 50 μm and about 80 μm, and more particularly, between about 55 μm and about 65 μm. Thus, the formability of the moisture barrier layer 20b is enhanced. Here, in order to enhance the formability of the drawing assistance layer 20d, the drawing assistance layer 20d may have the thickness of between about 20 μm and about 50 μm, and preferably, between about 25 μm and about 38 μm. If the thickness is less than about 20 μm, the drawing assistance layer 20d does not conform to the enhanced formability of the moisture barrier layer 20b and may be damaged while being drawn. On the contrary, if the thickness is greater than about 50 μm, the overall thickness of the pouch becomes excessively large. Thus, the volume of the secondary battery 1 may increase, and the energy density may be deteriorated. Particularly, according to the embodiment disclosed herein, the ratio of thicknesses between the drawing assistance layer 20d and the moisture barrier layer 20b may be less than about 1:2.5. That is, a proportion of the drawing assistance layer 20d to the thickness may increase more than that of the related art. However, when the thickness of the drawing assistance layer 20d excessively increases, the overall thickness of the pouch becomes large. Thus, the ratio of thickness may be greater than about 1:1.5 so as to prevent the overall thickness from becoming excessive. That is, the ratio of thickness may be between about 1:1.5 and about 1:2.5.

FIG. 9 is a graph showing the iron and silicon contents in each of an alloy no. AA8079 aluminum alloy and an alloy no. AA8021 aluminum alloy.

The mechanical strength is enhanced when a large amount of iron is contained in the aluminum alloy, but the flexibility is enhanced when a small amount of iron is contained. The alloy no. AA8079 among the aluminum alloys includes between about 0.6 wt % and about 1.2 wt % of iron and about 0.3 wt % or less of silicon. That is, when the moisture barrier layer 20b is made of the alloy no. AA8079 aluminum alloy, a relatively small amount of iron is included, and the flexibility may be enhanced. However, the strength may be deteriorated, and there may be a limitation on the formability.

On the other hand, the alloy no. AA8021 among the aluminum alloys includes between about 1.2 wt % and about 1.7 wt % of iron, and more particularly, between about 1.3 wt % and about 1.7 wt % of iron and about 0.2 wt % or less of silicon. That is, when the moisture barrier layer 20b is made of the alloy no. AA8021 aluminum alloy, a relatively large amount of iron is included, and thus, the tensile strength and elongation rate may be improved.

Meanwhile, when a tensile force is applied to a material, the relationship between the tensile strength and the elongation rate may be represented in a graph. Here, when the vertical axis of the graph represents the tensile strength and the horizontal axis represents the elongation rate, the area below the graph represents the toughness of the material. The toughness represents the ability to withstand fracture of a material. Thus, as the toughness of a material is higher, the material may be drawn as much as possible without being broken.

When the moisture barrier layer 20b is made of an alloy no. AA8021 aluminum alloy, the tensile strength and elongation rate are improved, compared to the related art. Thus, the toughness may be increased, and the formability may be enhanced.

FIG. 10 is a graph showing changes in a tensile strength, an elongation rate, and a grain size according to the iron content in each of the alloy no. AA8079 aluminum alloy and the alloy no. AA8021 aluminum alloy, and FIG. 11 is an enlarged SEM image of grains of each of the alloy no. AA8079 aluminum alloy and the alloy no. AA8021 aluminum alloy.

As illustrated in FIG. 10, the tensile strength, the elongation rate, and the grain size are changed according to the iron content in the aluminum alloy. Specifically, the tensile strength and elongation rate are proportional to the iron content, and thus, the tensile strength and elongation rate increase as the iron content increases. On the contrary, the grain size is inversely proportional to the iron content, and thus, the grain size decreases as the iron content increases.

As described above, the alloy no. AA8079 aluminum alloy includes between about 0.6 wt % and about 1.2 wt % of iron, and thus, the grain size is relatively large, for example, between about 13 μm and about 21 μm as illustrated in FIG. 11. The internal stress is therefore less dispersed when drawn, and the number of pin holes increases. As a result, the formability of the pouch film 20 is deteriorated.

On the other hand, the alloy no. AA8021 aluminum alloy includes between about 1.2 wt % and about 1.7 wt % of iron, and thus, the grain size is relatively small, for example, between about 10 μm and about 13 μm as illustrated in FIG. 11. Thus, the internal stress is more dispersed when drawn, compared to the related art, and the number of pin holes decreases. As a result, the formability of the pouch film 20 may be enhanced.

Thus, the aluminum alloy forming the moisture barrier layer 20b according to the embodiment disclosed herein may include between about 1.2 wt % and about 1.7 wt % of iron, and more particularly, between about 1.3 wt % and about 1.7 wt % of iron. Also, the aluminum alloy may include about 0.2 or less wt % of silicon. Moreover, the grain size may be about 10 μm and about 13 μm. That is, in the embodiment described herein, the aluminum alloy used to manufacture the moisture barrier layer 20b may be the alloy no. AA8021.

Consequently, the formability of the moisture barrier layer 20b is enhanced and the cup 22 of the pouch 20 may be drawn to be deeper depth. As a result, the peripheral portions 24 and 25 of the cup 22 may become almost vertical, such that the radius of curvature of the edge, which connects the bottom portion 23 and the peripheral portion 24 and 25 of the cup 22, may be reduced. Thus, a larger and thicker electrode assembly 10 may also be accommodated therein. Therefore, the secondary battery 1 including the pouch 20 may have increased energy efficiency with respect to the volume.

FIG. 12 is a partial perspective view illustrating a portion of an appearance of a pouch-type secondary battery according to an embodiment of the present invention, and FIG. 13 is another view of the portion the pouch-type secondary battery of FIG. 12 from a different angle.

In the secondary battery 1, the accommodation portion 22 may include: a first edge 41 connecting a top surface or a bottom surface 23 to the folding portion-side outer wall 24; a second edge 42 connecting the top surface or the bottom surface 23 to the sealing portion-side outer wall 25; a third edge 43 connecting the folding portion-side outer wall 24 to the sealing portion-side outer wall 25; and a corner 44 to which the first edge 41, the second edge 42, and the third edge 43 are connected.

The first edge 41, the second edge 42, and the third edge 43 may be rounded. In more detail, each of the edges 41, 42, and 43 may have a curved shape having a predetermined radius of curvature, and the radius of curvature may be constant or variable.

The first edge 41 may make a round connection between the top or bottom surface 23 of the accommodation portion 22 and the folding portion-side outer wall 24. The first edge 41 may extend in the longitudinal direction of the accommodation portion 22 and have a relatively constant radius of curvature in that direction.

The second edge 42 may make a round connection between the top or bottom surface 23 of the accommodation portion 22 and the sealing portion-side outer wall 25. The second edge 42 may extend in the width direction of the accommodation portion 22 and have a relatively constant radius of curvature in that direction.

The third edge 43 may make a round connection between the folding portion-side outer wall 24 and the sealing portion-side outer wall 25. The third edge 43 may extend in the stacking direction of an electrode assembly 10, that is, in the height direction of the accommodation portion 22, and have a relatively constant radius of curvature in that direction.

The radius of curvature of the third edge 43 may be greater than the radius of curvature of the first edge 41 and the radius of curvature of the second edge 42.

The corner 44 may be formed by connecting the first edge 41, the second edge 42, and the third edge 43 to each other. In order to prevent excessive stress from being concentrated on the corner 44 during as the pouch 20 is being formed, the corner 44 may have a curved shape at the junction of each of the first edge 41, the second edge 42, and the third edge 43.

The radius of curvature of the corner 44 may increase in a direction from a peripheral region to a central region. Thus, a boundary between the corner 44 and each of the edges 41, 42, and 43 may be defined as a position at which the radius of curvature begins to sharply increase between the corner 44 and each of the edges 41, 42, and 43. The boundary may be defined as a predetermined region in the extension direction of each of the edges 41, 42, and 43 or as one specific point.

In more detail, from a boundary B1 between the first edge 41 and the corner 44 toward the central region of the corner 44, the radius of curvature of the first edge 41 in the round direction may increase.

Also, from a boundary between the second edge 42 and the corner 44 toward the central region of the corner 44, the radius of curvature of the second edge 42 in the round direction may increase.

Moreover, from a boundary between the third edge 43 and the corner 44 toward the central region of the corner 44, the radius of curvature of the third edge 43 in the round direction may increase.

Meanwhile, the pouch 20 may include a protrusion portion 30 which connects an edge of the sealing portion 26 to the folding portion-side outer wall 24 and protrudes further than the edge of the sealing portion 26 in the width direction of the accommodation portion 22.

In more detail, the protrusion portion 30 may connect an edge 27a of a first sealing portion 27 to the folding portion 29 and protrude convexly outward in the width direction of the accommodation portion 22. At the same time, the protrusion portion 30 may have a curved shape that is recessed upward or downward.

While the pouch 20 is formed, not only the cup 22 but a region of the terrace 26 adjacent to the cup 22 may be slightly drawn. Thus, as the secondary battery 1 is manufactured, and the folding portion 29 is folded, the regions that are slightly drawn are accumulated to form the protrusion portion 30.

The protrusion portion 30 may overlap the folding portion-side outer wall 24 and the folding portion 29. The folding portion 29 may have a groove shape connected from one end portion of the folding portion-side outer wall 24 to the other end portion of the folding portion-side outer wall 24.

A boundary B2 between the protrusion portion 30 and the folding portion 29 may be positioned further outward, in the longitudinal direction of the folding portion 29, than the boundary B1 between the first edge 41 and the corner 44. That is, the boundary B2 between the protrusion portion 30 and the folding portion 29 may be positioned at a location that overlaps the corner 44 rather than the first edge 41 in the height direction of the accommodation portion 22.

The protrusion feature 30 is achieved by improving the formability of the pouch film 20 when compared to the related art. By minimizing the length or size of the protrusion portion 30, the secondary battery 1 may have a sharp appearance, and the secondary battery 1 may have enhanced energy density. In addition, the cooling efficiency by a cooling unit 3 may be enhanced in a battery module 100 (see FIG. 20) which will be described later.

FIG. 14 is a perspective view illustrating an appearance of a pouch-type secondary battery according to the related art, and FIG. 15 is the pouch-type secondary battery of FIG. 14 when viewed in a different direction.

A secondary battery according to the related art will be described with reference to FIGS. 13 and 14 as a comparative example. For easy understanding, the same reference numerals will be used to describe similar components of the secondary battery 1 of the present invention and the related art.

In the secondary battery according to the related art, each of the first edge 41, the second edge 42, and the third edge 43 has a relatively large radius of curvature due to the poor formability of the pouch 20. Thus, there is a limitation in forming a sharp appearance, and wrinkling or creasing occurs.

Also, the wrinkling may occur at an end portion of each of the folding portion-side outer wall 24 and the sealing portion-side outer wall 25, and as a result, at least one of the first edge 41, the second edge 42, and the third edge 43 may have a radius of curvature that varies excessively along the extension direction.

For example, the wrinkling may occur at the end portion of the folding portion-side outer wall 24, and accordingly, the radius of curvature of the first edge 41 adjacent to a corner 44 may sharply increase or decrease. Thus, the shape of the corner 44 may be irregularly deformed.

Also, a groove shape formed by a folding portion 29 may not be connected to an end portion of the folding portion-side outer wall 24 but may instead disappear in the middle, such that a protrusion portion 30 may not be connected from the folding portion-side outer wall 24 to the folding portion 29.

Also, even if the protrusion portion 30 is connected to the folding portion 29, a boundary B2 between the protrusion portion 30 and the folding portion 29 may be positioned further outward, in the longitudinal direction of the folding portion 29, than a boundary B1 between the first edge 41 and the corner 44. That is, the boundary B2 between the protrusion portion 30 and the folding portion 29 may be positioned at a location that overlaps the first edge 41 in the height direction of an accommodation portion 22. This configuration is different from that of the present invention, and it is understood that the protrusion portion 30 of the secondary battery according to the related art is formed to be long and large.

FIGS. 16 and 17 are CT images for measuring a distance between a folding portion-side outer wall and a negative electrode according to an embodiment of the present invention.

In more detail, FIG. 16 is a computerized tomography (CT) image for measuring a first location P1 of FIG. 4, and FIG. 17 is a CT image for measuring a second location P2 of FIG. 4. However, a method for measuring a distance between a folding portion-side outer wall 24 and a negative electrode 14 is not limited thereto, and the distance may be measured through a method such as magnetic resonance imaging (MRI) or X-ray.

In the present invention, the formability of the pouch 20 is improved. Accordingly, the ends 14a of the plurality of negative electrodes 14 (see FIG. 5) and the folding portion-side outer wall 24 are spaced apart from each other, and distances therebetween may be configured to be as small as possible. In this case, the distances may represent horizontal distances between the ends 14a of the plurality of negative electrodes 14 (see FIG. 5) and the folding portion-side outer wall 24 when the secondary battery 1 is placed on a horizontal plane such as the floor.

The distance between an end 14a of a negative electrode 14 and the folding portion-side outer wall 24 may be less than the distance between the end 14a of the negative electrode 14 and an end 13a of a positive electrode 13.

Preferably, the distance between the end 14a of the negative electrode 14 and the folding portion-side outer wall 24 may be less than half the distance between the end 14a of the negative electrode 14 and the end 13a of the positive electrode 13.

That is, the distance between the end 14a of the negative electrode 14 and the folding portion-side outer wall 24 may be less than half the length of the negative electrode 13 that protrudes from the negative electrode 14 toward the folding portion-side outer wall 24. Such configuration is shown in FIGS. 16 and 17.

Accordingly, a void space within the pouch 20 may be minimized, the cooling efficiency by a cooling unit 3 (see FIG. 20), which will be described later, may increase, and the energy density of the secondary battery 1 may increase.

In more detail, the average distance between the end 14a of the plurality of negative electrodes 14 and the folding portion-side outer wall 24 may be about 0.6 mm or less. The average distance may represent a measurement at any one location in the extension direction of the folding portion-side outer wall 24. The average distance may vary along the extension direction of the folding portion-side outer wall 24.

Also, the maximum distance between the end 14a of the plurality of negative electrodes 14 and the folding portion-side outer wall 24 may be about 0.8 mm or less. If the maximum distance is greater than about 0.8 mm, and when the average distance is about 0.6 mm or less, the deviation of distances between the end 14a of the plurality of negative electrodes 14 and the folding portion-side outer wall 24 becomes excessively large, and the quality of the secondary battery 1 becomes ununiformed.

Each of a plurality of average distances measured at a plurality of locations spaced apart from each other in the extension direction of the folding portion-side outer wall 24 may be about 0.6 mm or less. Also, the total average distance, which is the average of the plurality of average distances, is about 0.5 mm or less.

For example, at a first location P1 (see FIG. 4) close to one end portion of both end portions of the folding portion-side outer wall 24, the average distance between the ends 14a of the plurality of negative electrodes 14 and the folding portion-side outer wall 24 is referred to as a first distance. Also, at a second location P2 (see FIG. 4) close to the other end portion of both the end portions of the folding portion-side outer wall 24, the average distance between the ends 14a of the plurality of negative electrodes 14 and the folding portion-side outer wall 24 is referred to as a second distance. In this case, each of the first distance and the second distance may be about 0.6 mm or less, and the average of the first distance and the second distance, that is, the total average distance may be about 0.5 mm or less.

Accordingly, along the extension direction of the folding portion-side outer wall 24, overall gaps between the end 14a of the plurality of negative electrodes 14 and the folding portion-side outer wall 24 may be minimized.

If the total average distance is greater than about 0.5 mm, a void space within the pouch 20 becomes relatively large. Accordingly, the cooling efficiency by the cooling unit 3 (see FIG. 20), which will be described later, is deteriorated, and the energy density of the secondary battery 1 is reduced.

Also, when the average distance is greater than about 0.6 mm at even one location of the folding portion-side outer wall 24, this location protrudes from its surroundings. Accordingly, there is a limitation in obtaining the secondary battery 1 having an aesthetically pleasing appearance. Also, this location may not be properly cooled by the cooling unit 3 (see FIG. 20) which will be described later, and thus, the temperature at this location may be locally raised.

Referring to FIGS. 16 and 17 as an experimental example, it was determined that, at the first location P1, the distances between the folding portion-side outer wall 24 and the five negative electrodes 14, which are spaced apart from each other in the stacking direction of the electrode assembly 10, were measured to be about 0.60 mm, 0.74 mm, 0.53 mm, 0.30 mm, and 0.39 mm. Thus, the maximum distance was about 0.74 mm, and the average distance was about 0.51 mm.

Also, it was determined that, at the second location P2, the distances between the folding portion-side outer wall 24 and the five negative electrodes 14, which are spaced apart from each other in the stacking direction of the electrode assembly 10, were measured to be about 0.22 mm, 0.54 mm, 0.41 mm, 0.57 mm, and 0.39 mm. Thus, the maximum distance was about 0.57 mm, and the average distance was about 0.43 mm.

Thus, it may be confirmed that the total average distance of the first location P1 and the second location P2 was about 0.47 mm.

That is, in the present invention, it was determined that the maximum distance at each of the locations P1 and P2 is about 0.8 mm or less, the average distance at each of the locations P1 and P2 is about 0.6 mm or less, and the total average distance is about 0.5 mm or less.

Meanwhile, a virtual line VP, which is in contact with the innermost side of the folding portion 29 and which is parallel to the stacking direction of the electrode assembly 10, may pass through at least one of the top surface 23, the bottom surface 23, or the first edge 41 of the accommodation portion 22.

Referring to FIG. 16, it is illustrated that the virtual line VP passes through the first edge 41 at the first location P1. Also, referring to FIG. 17, it is illustrated that the virtual line VP passes through the top and bottom surfaces 23 of the accommodation portion 22 at the second location P2.

This configuration may be obtained by improving the formability of the pouch 20 of the present invention. Accordingly, the void space within the pouch 20 may be minimized, the cooling efficiency by the cooling unit 3 (see FIG. 20), which will be described later, may increase, and the energy density of the secondary battery 1 may increase.

FIGS. 18 and 19 are CT images in which a distance between a pouch and a negative electrode according to the related art is measured.

In more detail, FIG. 18 is a CT image in which a region corresponding to the first location P1 is measured in a secondary battery of the related art, and FIG. 19 is a CT image in which a region corresponding to the second location P2 is measured in the secondary battery of the related art.

Referring to FIGS. 18 and 19 as a comparative example, it was determined that the distance between an end 14a of the negative electrode 14 and the folding portion-side outer wall 24 is greater than half the distance between the end 14a of the negative electrode 14 and end 13a of a positive electrode 13. It was also determined that the distances between the ends 14a of some negative electrodes 14 and the folding portion-side outer wall 24 are even greater than the distances between the ends 14a of the negative electrodes 14 and ends 13a of positive electrodes 13.

Thus, in the secondary battery according to the related art, a void space within the pouch 20 is formed to be large. Thus, the cooling efficiency of the secondary battery is deteriorated, and the energy density is reduced.

Also, it can be seen that, at a region corresponding to the first location P1, the distances between the folding portion-side outer wall 24 and the five negative electrodes 14, which are spaced apart from each other in the stacking direction of the electrode assembly 10, were measured to be about 0.89 mm, 1.19 mm, 0.84 mm, 0.94 mm, and 1.23 mm. Thus, the maximum distance was about 1.23 mm, and the average distance was about 1.01 mm.

Also, it is shown that, at a region corresponding to the second location P2, the distances between the folding portion-side outer wall 24 and the five negative electrodes 14, which are spaced apart from each other in the stacking direction of the electrode assembly 10, were measured to be about 0.90 mm, 0.89 mm, 0.89 mm, 1.22 mm, and 0.75 mm.

Thus, the maximum distance was about 1.22 mm, and the average distance was about 0.93 mm.

Thus, it may be confirmed that the total average distance of the regions respectively corresponding to the first location P1 and the second location P2 was about 0.97 mm.

That is, it may be confirmed that, unlike the present invention, the comparative example has the maximum distance of greater than about 0.8 mm at each of the regions, the average distance of greater than about 0.6 mm at each of the regions, and the total average distance of greater than about 0.5 mm.

Also, referring to FIG. 18, it is illustrated that the groove shape of the folding portion 29 disappears at the region corresponding to the first location P1 by wrinkling of the folding portion-side outer wall 24. Thus, it is impossible to define the virtual line.

Referring to FIG. 19, it is illustrated that the virtual line VP is defined at the region corresponding to the second location P2. However, the virtual line VP does not pass through a top surface 23, a bottom surface 23, or a first edge 41 of an accommodation portion 22 but passes through the folding portion-side outer wall 24 instead. This is because the formability of the pouch 20 is not good in the secondary battery according to the related art. Accordingly, the folding portion-side outer wall 24 is not formed to be almost vertical, and the radius of curvature of the first edge 41 is formed to be large.

FIG. 20 is a schematic view of a battery module according to an embodiment of the present invention.

A plurality of secondary batteries 1 are often utilized in medium and large sized electronic devices such as automobiles because these devices need high output. In order to easily move and install the secondary batteries 1, a battery module 100 including the plurality of secondary batteries 1 may be manufactured.

In more detail, the battery module 100 may include a plurality of secondary batteries 1, a housing 2 which accommodates the plurality of secondary batteries 1, and a cooling unit 3 provided on a bottom surface inside the housing 2 which cools the plurality of secondary batteries 1.

The housing 2 may have an approximately box shape, but the embodiment is not limited thereto. The housing 2 may form the appearance of the battery module 100.

The plurality of secondary batteries 1 may be stacked within the housing 2 while standing vertically. In more detail, the plurality of secondary batteries 1 may stand such that a folding portion-side outer wall 24 faces the bottom and a second sealing portion 28 faces the top. Thus, the folding portion-side outer wall 24 may come into contact with the cooling unit 3. The folding portion-side outer wall 24 may be formed to be longer than the second sealing portion 28, and thus, the cooling efficiency of each of the secondary batteries 1 may be enhanced by the cooling unit 3.

Also, an electrode lead 16 of each of the secondary batteries 1 may be connected to a bus bar (not shown) to transmit power to the outside.

The cooling unit 3 may be adjacent to the folding portion-side outer walls 24 of the plurality of secondary batteries 1 to cool the plurality of secondary batteries 1. The cooling unit 3 may cool heat generated through a chemical reaction while electricity is generated in an electrode assembly 10 of the secondary battery 1.

The folding portion-side outer wall 24 of each of the secondary batteries 1 may be in direct contact with the cooling unit 3. However, the embodiment is not limited thereto, and a medium such as thermal grease may be provided between the folding portion-side outer wall 24 and the cooling unit 3.

The cooling unit 3 may have an approximately plate shape, and may be manufactured separately from the housing 2 and disposed on the bottom surface inside the housing. Also, it is also possible that the cooling unit 3 forms the bottom surface of the housing 2.

The cooling unit 3 may operate in an air or water cooling method, and the configuration and method thereof are not limited thereto. As one example, a flow path through which cooling water flows may be formed inside the cooling unit 3 having the plate shape.

Meanwhile, as described above, the distance between the folding portion-side outer wall 24 and the plurality of negative electrodes 14 in each of the secondary batteries 1 may be minimized. Thus, the heat of electrode assemblies 10 may be effectively cooled by the cooling unit 3.

Accordingly, it is possible to prevent a malfunction from occurring due to high temperature in a circuit of an electronic device in which the secondary batteries 1 are installed. Also, it is possible to prevent a lifespan of the electronic device from being shortened due to the high temperature.

Also, as described above, the protrusion portion 30 of each of the secondary batteries 1 may be formed to be very small. Thus, even if a gap is formed by the protrusion portion 30 between the folding portion-side outer wall 24 and the cooling unit 3, the gap may be very small. Thus, an amount of a medium such as thermal grease injected into the gap may be reduced.

According to a preferred embodiment of the present invention, the formability of the pouch is improved, and thus, the distance between the plurality of electrodes and the pouch may be reduced compared to the related art. Accordingly, the appearance of the secondary battery may be formed to be sharp.

Also, the void space within the pouch may be reduced, and the energy density of the secondary battery may be enhanced.

Also, the cooling efficiency of the electrode assembly may be enhanced in the battery module by the cooling unit.

The technical ideas of the present invention have been described merely for illustrative purposes, and those skilled in the art will appreciate that various changes and modifications are possible without departing from the essential features of the present invention.

Thus, the embodiments of the present invention are to be considered illustrative, and not restrictive, and the technical spirit of the present invention is not limited to the foregoing embodiments.

Therefore, the scope of the present invention is defined by the appended claims, and all technical ideas within their equivalents should be interpreted to be included in the scope of the present invention.

What is claimed is:

1. A pouch-type secondary battery comprising:
    an electrode assembly including positive electrodes and negative electrodes alternately stacked with separators therebetween; and
    a pouch including a pair of cases integrally connected to each other at a folding portion and a terrace including an expansion portion opposite the folding portion and a pair of sides connecting the folding portion to the expansion portion, wherein the electrode tabs are arranged to protrude from the pair of sides, the pouch including walls defining a perimeter of an accommodation portion for accommodating the electrode assembly, the walls comprising:
a folding portion-side outer wall comprising the folding portion; and
a sealing portion-side outer wall connected to a sealing portion of one side of the pair of sides, wherein the sealing portion includes at least a portion of the pair of cases fused together,
wherein ends of the negative electrodes are spaced from the folding portion-side outer wall, and
wherein an average distance between the ends of the negative electrodes and the folding portion-side outer wall is in a range from 0.22 mm to 0.8 mm,
wherein the accommodation portion comprises:
a first rounded edge connecting a top or bottom surface of the accommodation portion to the folding portion-side outer wall;
a second rounded edge connecting the top or the bottom surface of the accommodation portion to the sealing portion-side outer wall;
a third rounded edge connecting the folding portion-side outer wall to the sealing portion-side outer wall; and
a corner to which the first rounded edge, the second rounded edge, and the third rounded edge are connected,
wherein a radius of curvature of the third rounded edge is greater than a radius of curvature of the first rounded edge and a radius of curvature of the second rounded edge, and
wherein a maximum distance between the ends of the negative electrodes and the folding portion-side outer wall is approximately equal to or less than 0.8 mm.

2. The pouch-type secondary battery of claim 1, wherein, with respect to a plurality of locations spaced apart from each other in a longitudinal direction of the folding portion-side outer wall, the average distance between the ends of the negative electrodes and the folding portion-side outer wall is approximately equal to or less than 0.5 mm.

3. The pouch-type secondary battery of claim 1, wherein the ends of the negative electrodes protrude further toward the folding portion-side outer wall than ends of the positive electrodes, and
the average distance between the ends of the negative electrodes and the folding portion-side outer wall is less than an average distance between the ends of the negative electrodes and the ends of the positive electrodes.

4. The pouch-type secondary battery of claim 3, wherein a distance between each of the ends of the negative electrodes and the folding portion-side outer wall is less than half a distance between each of the ends of the negative electrodes and each of the ends of the positive electrodes.

5. The pouch-type secondary battery of claim 1, wherein the folding portion has a groove shape extending from one end to another end of the folding portion-side outer wall.

6. The pouch-type secondary battery of claim 1, wherein a virtual plane, which is in contact with an innermost side of the folding portion and oriented parallel to a stacking direction of the electrode assembly, passes through at least one of the top surface, the bottom surface, or the first rounded edge of the accommodation portion.

7. The pouch-type secondary battery of claim 1, wherein a radius of curvature of the corner increases in a direction from a peripheral region to a central region.

8. The pouch-type secondary battery of claim 1, wherein the pouch comprises a protrusion portion which connects an edge of the sealing portion to the folding portion and protrudes further than the edge of the sealing portion in a width direction of the accommodation portion, and
a boundary between the protrusion portion and the folding portion is positioned further outward, in a longitudinal direction of the folding portion, than a boundary between the first edge and the corner.

9. The pouch-type secondary battery of claim 1, wherein the pouch is manufactured by forming a pouch film,
wherein the pouch film comprises:
a sealant layer made of a first polymer and formed as an innermost layer;
a surface protection layer made of a second polymer and formed as an outermost layer; and
a moisture barrier layer provided between the surface protection layer and the sealant layer, the moisture barrier layer being formed of a metal including an alloy no. AA80XX series aluminum alloy,
wherein a thickness of the moisture barrier layer is between about 50 μm and about 80 μm, and
a thickness of the sealant layer is between about 60 μm and about 100 μm.

10. The pouch-type secondary battery of claim 9, wherein the aluminum alloy is AA8021.

11. The pouch-type secondary battery of claim 9, wherein the aluminum alloy comprises between about 1.3 wt % and about 1.7 wt % of iron and approximately 0.2 wt % or less of silicon, and has a grain size of between about 10 μm and about 13 μm.

12. The pouch-type secondary battery of claim 9, wherein the thickness of the moisture barrier layer is between about 55 μm and about 65 μm, and
the thickness of the sealant layer is between about 75 μm and about 85 μm.

13. The pouch-type secondary battery of claim 9, wherein the pouch film further comprises a drawing assistance layer stacked between the surface protection layer and the moisture barrier layer, the drawing assistance layer including a third polymer.

14. The pouch-type secondary battery of claim 13, wherein a thickness of the drawing assistance layer is between about 20 μm and about 50 μm.

15. A battery module, comprising:
a housing;
a plurality of pouch-type secondary batteries according to claim 1 stacked vertically within the housing; and
a cooling unit provided on a bottom surface inside the housing and configured to cool the plurality of the pouch-type secondary batteries.

16. A pouch-type secondary battery comprising:
an electrode assembly including positive electrodes and negative electrodes alternately stacked with separators therebetween; and
a pouch including a pair of cases integrally connected to each other at a folding portion and a terrace including an expansion portion opposite the folding portion and a pair of sides connecting the folding portion to the expansion portion, wherein the electrode tabs are arranged to protrude from the pair of sides, the pouch including outer walls defining a perimeter of an accommodation portion accommodating the electrode assembly, the walls comprising:
a folding portion-side outer wall comprising the folding portion; and a sealing portion-side outer wall connected to a sealing portion of one side of the pair of sides, wherein the sealing portion includes at least a portion of the pair of cases fused together, wherein ends of the negative electrodes are spaced from the folding portion-side outer wall, wherein the ends of the negative electrodes protrude further toward the folding portion-side outer wall than ends of the positive electrodes protrude toward the folding portion-side, and a distance between each of the ends of the negative electrodes and the folding portion-side outer wall is less than half a distance between each of the ends of the negative electrodes and each of the ends of the positive electrodes, wherein the accommodation portion comprises:
- a first rounded edge connecting a top or bottom surface of the accommodation portion to the folding portion-side outer wall;
- a second rounded edge connecting the top or the bottom surface of the accommodation portion to the sealing portion-side outer wall;
- a third rounded edge connecting the folding portion-side outer wall to the sealing portion-side outer wall; and
- a corner to which the first rounded edge, the second rounded edge, and the third rounded edge are connected, wherein the first, second, and third rounded edges are a continuous curved connection without an inflection point, wherein a radius of curvature of the third rounded edge is greater than a radius of curvature of the first rounded edge and a radius of curvature of the second rounded edge.

17. A battery module comprising:
a housing;
a plurality of secondary batteries according to claim 16 stacked vertically within the housing; and
a cooling unit provided on a bottom surface inside the housing and configured to cool the plurality of secondary batteries.

* * * * *